United States Patent
Oh et al.

(10) Patent No.: US 12,309,781 B2
(45) Date of Patent: May 20, 2025

(54) METHOD AND DEVICE FOR TRANSMITTING UPLINK CONTROL INFORMATION IN A WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Hyunseok Ryu, Gyeonggi-do (KR); Jonghyun Bang, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 490 days.

(21) Appl. No.: 17/628,469

(22) PCT Filed: Jul. 21, 2020

(86) PCT No.: PCT/KR2020/009604
§ 371 (c)(1),
(2) Date: Jan. 19, 2022

(87) PCT Pub. No.: WO2021/015534
PCT Pub. Date: Jan. 28, 2021

(65) Prior Publication Data
US 2022/0256577 A1    Aug. 11, 2022

(30) Foreign Application Priority Data
Jul. 22, 2019   (KR) .................... 10-2019-0088533

(51) Int. Cl.
*H04W 72/21* (2023.01)
*H04W 16/14* (2009.01)
*H04W 74/0808* (2024.01)

(52) U.S. Cl.
CPC ........... *H04W 72/21* (2023.01); *H04W 16/14* (2013.01); *H04W 74/0808* (2013.01)

(58) Field of Classification Search
CPC .. H04W 72/21; H04W 16/14; H04W 74/0808
See application file for complete search history.

(56) References Cited

U.S. PATENT DOCUMENTS

| | | | |
|---|---|---|---|
| 2018/0270860 A1 | 9/2018 | Bhorkar et al. | |
| 2019/0075581 A1* | 3/2019 | Salem | H04W 16/14 |

(Continued)

FOREIGN PATENT DOCUMENTS

| | | | | |
|---|---|---|---|---|
| CA | 3097216 A1 * | 7/2020 | ........... | H04L 1/1812 |
| WO | WO-2017131465 A1 * | 8/2017 | ............... | H04B 7/26 |

(Continued)

OTHER PUBLICATIONS

Huawei, HiSilicon, "Coexistence and Channel Access for NR Unlicensed Band Operations", R1-1906044, 3GPP TSG RAN WG1 Meeting #97, May 13-17, 2019, 21 pages.

(Continued)

*Primary Examiner* — Saad A. Waqas
(74) *Attorney, Agent, or Firm* — The Farrell Law Firm, P.C.

(57) ABSTRACT

According to an embodiment of the disclosure, a method and apparatus for transmitting or receiving, by a user equipment (UE), signals in a wireless communication system is provided. The method, performed by the UE, of transmitting or receiving a signal may include receiving scheduling information for an uplink (UL) channel from a base station (BS), identifying a channel access type available for the UE for each of a plurality of UL channels based on the scheduling information, determining a UL channel in which UL control information (UCI) is multiplexed and transmitted in an unlicensed band among the plurality of UL channels based on the channel access type for each UL channel, and multiplexing and transmitting the UCI to the BS in the determined UL channel.

15 Claims, 13 Drawing Sheets

(56) References Cited

U.S. PATENT DOCUMENTS

2022/0150917 A1* 5/2022 Wang .................... H04W 16/14
2022/0210827 A1* 6/2022 Wang .................... H04W 16/14

FOREIGN PATENT DOCUMENTS

WO     WO-2018021783 A1 * 2/2018 ............. H04L 27/26
WO     WO-2020031427 A1 * 2/2020

OTHER PUBLICATIONS

LG Electronics, Channel Access Procedure for NR-U, R1-1906675, 3GPP TSG RAN WG1 Meeting #97, May 13-17, 2019, 14 pages.

Intel Corporation, "Channel Access Mechanism for NR-unlicensed", R1-1906785, 3GPP TSG RAN WG1 Meeting #97, May 13-17, 2019, 17 pages.

European Search Report dated Jul. 6, 2022 issued in counterpart application No. 20843831.7-1215, 12 pages.

Qualcomm Incorporated, "Channel Access Procedures for NR Unlicensed", R1-1907261, 3GPP TSG RAN WG1 Meeting #97, May 13-17, 2019, 18 pages.

NTT Docomo, Inc., "Channel Access Procedures for NR-U", R1-1906197, 3GPP TSG RAN WG1 #97, May 13-17, 2019, 4 pages.

Vivo, "Discussion on the Enhancements to Configured Grants", R1-1906133, 3GPP TSG RAN WG1 #97, May 13-17, 2019, 10 pages.

LG Electronics, "Discussion on Configured Grant for NR-U", R1-1906678, 3GPP TSG RAN WG1 Meeting #97, May 13-17, 2019, 8 pages.

International Search Report dated Oct. 15, 2020 issued in counterpart application No. PCT/KR2020/009604, 13 pages.

European Search Report dated Oct. 21, 2024 issued in counterpart application No. 20843831.7-1215, 7 pages.

* cited by examiner

METHOD AND DEVICE FOR TRANSMITTING UPLINK CONTROL INFORMATION IN A WIRELESS COMMUNICATION SYSTEM

PRIORITY

This application is a National Phase Entry of PCT International Application No. PCT/KR2020/009604, which was filed on Jul. 21, 2020, and claims priority to Korean Patent Application No. 10-2019-0088533, which was filed on Jul. 22, 2019, the entire content of each of which is incorporated herein by reference.

TECHNICAL FIELD

The disclosure relates to a wireless communication system. The disclosure may include a method and apparatus for determining and transmitting a resource to transmit uplink control information in a wireless communication system.

BACKGROUND ART

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multipoints (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud radio access network (cloud RAN) as the aforementioned big data processing technology may be an example of convergence of 5G and IoT technologies.

DESCRIPTION OF EMBODIMENTS

Technical Problem

The disclosure relates to a method of transmitting, by a user equipment (UE), uplink (UL) control information in a wireless communication system, and in an embodiment, the method, performed by the UE, of transmitting UL control information in a wireless communication system may include receiving scheduling information for a UL channel from a base station (BS), identifying a channel access type available for the UE for each of a plurality of UL channels based on the scheduling information, determining a UL channel in which to multiplex and transmit UL control information (UCI) in an unlicensed band among the plurality of UL channels based on the channel access type for each UL channel, and transmitting multiplexed UCI to the BS via the determined UL channel.

BEST MODE

Figure 1:
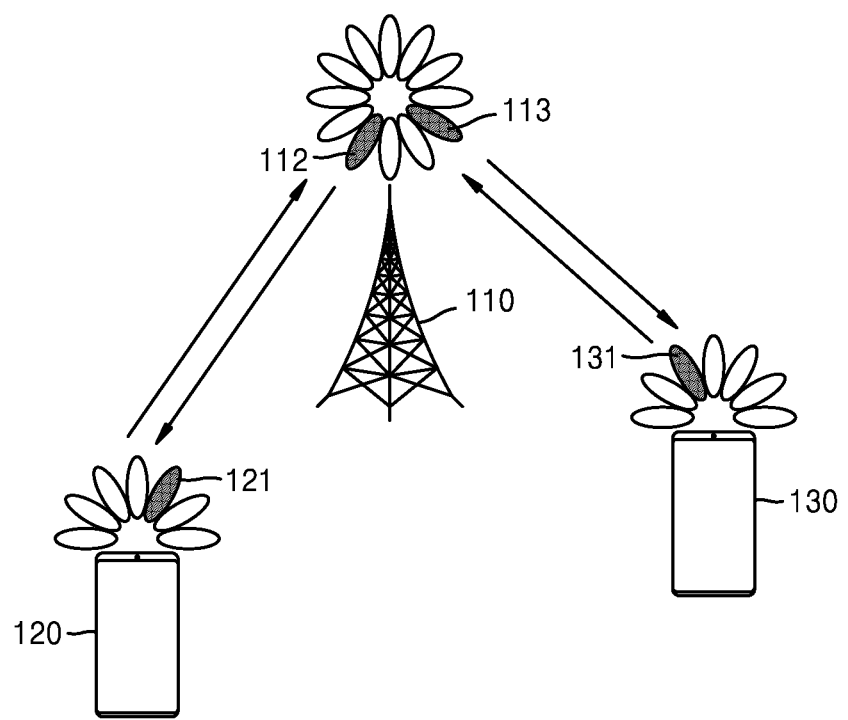
FIG. 1 illustrates a wireless communication system, according to various embodiments of the disclosure.

According to an embodiment of the disclosure, a method, performed by a user equipment (UE), of transmitting or receiving a signal in a wireless communication system may be provided. The method, performed by the UE, of transmitting or receiving a signal may include receiving scheduling information for a uplink (UL) channel from a base station (BS); identifying a channel access type available for the UE for each of a plurality of UL channels based on the scheduling information; determining a UL channel in which UL control information (UCI) is multiplexed and transmitted in an unlicensed band among the plurality of UL channels based on the channel access type for each UL channel; and transmitting multiplexed UCI to the BS via the determined UL channel.

In an embodiment of the disclosure, the UL channel in which the UCI is multiplexed and transmitted may be determined to be a UL channel corresponding to a channel access type in which transmission is performed without a channel access procedure among the plurality of UL channels.

In an embodiment of the disclosure, the UL channel in which the UCI is multiplexed and transmitted may be determined to be a UL channel corresponding to a channel access procedure type having the shortest period of time required to perform the channel access procedure among the plurality of UL channels.

In an embodiment of the disclosure, the method may further include receiving, from the BS, at least one of information about a result of a channel access procedure performed by the BS for each channel and channel occupancy time information for a channel accessed by the BS; and identifying a channel occupied by the BS based on the received information.

In an embodiment of the disclosure, when the plurality of UL channels are identified as having the same channel access type, the UL channel in which the UCI is multiplexed and transmitted may be determined to be a channel occupied by the BS among the plurality of UL channels.

In an embodiment of the disclosure, when the plurality of UL channels are identified as having the same channel access type, the UL channel in which the UCI is multiplexed may be transmitted in a cell corresponding to a smallest index value.

In an embodiment of the disclosure, the channel access procedure performed by the UE in the unlicensed band may be listen before talk (LBT).

In an embodiment of the disclosure, the identifying of the channel access type available for the UE for each of the plurality of UL channels based on the scheduling information may further include: identifying a transmission time for each of the plurality of UL channels; obtaining a time difference between the transmission time for each of the plurality of UL channels and a transmission time for a UL channel transmitted before transmission of the plurality of UL channels or a time difference between the transmission time for each of the plurality of UL channels and a reception time of a downlink (DL) channel received before transmission of the plurality of UL channels; and identifying a channel access type available for the UE for each of the plurality of UL channels based on the time difference for each of the plurality of UL channels.

In an embodiment of the disclosure, the UL channel in which the UCI is multiplexed and transmitted may be determined to be a UL channel corresponding to a channel access type having the time difference corresponding to a smallest value.

In an embodiment of the disclosure, the UL channel in which the UCI is multiplexed and transmitted may be determined to be a UL channel corresponding to a channel access type having the time difference within a preset time.

According to an embodiment of the disclosure, a method, performed by a BS, of transmitting or receiving a signal in a wireless communication system may be provided. The method, performed by the BS, may include transmitting scheduling information for a UL channel to a UE; and receiving, from the UE, multiplexed UCI via a UL channel determined based on a channel access type for each of the plurality of UL channels identified based on the scheduling information in an unlicensed band.

In an embodiment of the disclosure, the method, performed by the BS, may further include performing a channel access procedure in the unlicensed band; and transmitting, to the UE, at least one of information about a result of a channel access procedure performed by the BS for each channel or channel occupancy time information for a channel accessed by the BS.

In an embodiment of the disclosure, when the plurality of UL channels are identified as having the same channel access type, the UL channel in which the UCI is multiplexed and transmitted may be determined to be a channel occupied by the BS among the plurality of UL channels.

According to an embodiment of the disclosure, a UE for transmitting or receiving a signal in a wireless communication system may be provided. The UE may include a transceiver; and at least one or more processors configured to control the transceiver.

In an embodiment of the disclosure, the at least one or more processors may be configured to control the transceiver to receive, from a BS, scheduling information for a UL channel, identify a channel access type available for the UE for each of a plurality of UL channels based on the scheduling information, determine a UL channel in which to multiplex and transmit UCI in an unlicensed band among the plurality of UL channels based on the channel access type for each uplink channel, and control the transceiver to transmit multiplexed UCI to the BS via the determined UL channel.

In an embodiment of the disclosure, the UL channel in which the UCI is multiplexed and transmitted may be determined to be a UL channel corresponding to a channel access type in which transmission is performed without a channel access procedure among the plurality of UL channels.

MODE OF DISCLOSURE

Hereinafter, embodiments of the disclosure are described in detail with reference to the accompanying drawings. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Advantages and features of the disclosure, and methods for achieving them will be understood more clearly when the following embodiments of the disclosure are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers may refer to like elements throughout the specification.

Embodiments of the disclosure will be described in detail with reference to accompanying drawings.

Technological content well-known in the art or not directly related to the disclosure will be omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments of the disclosure are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers may refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which may perform some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a higher number of components and modules. Moreover, the components and modules may be implemented to execute one or more central processing units (CPUs) in a device or security multimedia card. In embodiments of the disclosure, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e communication standards. Furthermore, for the fifth generation (5G) wireless communication system, communication standards for 5G or new radio (NR) are being developed.

For the 5G communication system, various technologies such as a technology for transmitting uplink signals without code block group (CGB) based retransmission or uplink scheduling (e.g., grant-free uplink transmission) to provide various services and support high data transfer rate will be introduced. As such, in a wireless communication system including 5G, at least one of enhanced mobile broadband (eMBB), massive machine type communications (mMTC), or ultra-reliable and low-latency communications (URLLC) service may be provided for the terminal. The aforementioned services may be provided to the same terminal during the same time interval. In an embodiment of the disclosure, the eMBB may be a service for high rate transmission of high volume data, the mMTC for least power consumption at the terminal and access of multiple terminals, and the URLLC for high reliability and low latency, without being limited thereto. These three types of services may be major scenarios in an LTE system or a beyond LTE system such as 5G/NR, but are not limited thereto. The services of the 5G system are examples, and available services in the 5G system are not limited thereto. A system for providing the URLLC service may be referred to as a URLLC system, and a system for providing the eMBB service may be referred to as an eMBB system. The terms service and system may be interchangeably used.

In the following description, a base station (BS) is an entity for performing resource allocation for a terminal, and may include at least one of an eNodeB, a Node B, a radio access unit, a base station controller, or a network node. A terminal may include at least one of a user equipment (UE), a mobile station (MS), a cellular phone, a smart phone, a computer, or a multimedia system capable of performing a communication function. Herein, downlink (DL) may refer to a radio transmission path for a signal transmitted from a BS to a terminal, and uplink (UL) may refer to a radio transmission path for a signal transmitted from a terminal to a BS. Embodiments of the disclosure will now be described by taking an example of an LTE or LTE-A system, and in explaining a method and apparatus proposed in the disclosure, such terms as physical channel(s) and signal(s) may be used in relation to the traditional LTE or LTE-A system. Embodiments of the disclosure will also be applied to other communication systems with similar technical backgrounds or channel types to the mobile communication system as will be described in the disclosure. For example, the latter corresponds to a 5G mobile communication technology (5G or NR) developed after LTE-A. Accordingly, embodiments of the disclosure will also be applied to other communication systems through some modifications to an extent that does not significantly deviate from the scope of the disclosure when judged by those of ordinary skill in the art.

As a representative example of such a broadband wireless communication system, the 5G or NR system adopts Orthogonal Frequency Division Multiplexing (OFDM) for downlink (DL) and both the OFDM and Single Carrier Frequency Division Multiple Access (SC-FDMA) or DFT spread OFDM (DFT-s-OFDM) for uplink (UL). Such a multiple access scheme allocates and operates time-frequency resources for carrying data or control information for respective users not to overlap each other, i.e., to maintain orthogonality, thereby differentiating each user's data or control information.

The NR system adopts a Hybrid Automatic Repeat request (HARQ) scheme that retransmits corresponding data at the physical layer in case decoding fails at the initial stage of transmission. By the HARQ scheme, when a receiver fails to correctly decode data, the receiver transmits information indicating the decoding failure (NACK; Negative Acknowledgment) to a transmitter so that the transmitter may retransmit the corresponding data at the physical layer. The receiver may increase data reception capability by combining the data retransmitted by the transmitter with the data for which decoding has failed. Further, by the HARQ scheme, when the receiver correctly decodes data, the receiver may transmit information indicating that decoding succeeds (ACK; Acknowledgment) to the transmitter so that the transmitter may transmit new data.

In the following description, the terms referring to a signal, a channel, control information, network entities, components of an apparatus, etc., are mentioned for convenience of explanation. The disclosure is not limited to the terms as will be used in the following description, and may use different terms having the same meaning in a technological sense.

Furthermore, various embodiments of the disclosure may be described with the terms used in some communication standards (e.g., the third generation partnership project (3GPP)), but the terms are merely examples for explanation. Various embodiments of the disclosure may also be applied with simple modifications to other communication systems.

Various embodiment of the disclosure will be described based on an NR system, but are not limited thereto and may be applied to various wireless communication systems such as LTE, LTE-A, LTE-A-Pro, 5G, etc. Moreover, the disclosure will be described based on the assumption of a system and apparatus for transmitting or receiving signals using an unlicensed band, but may also be applied to a system operating in a licensed band.

In the disclosure, higher layer signaling or a higher layer signal may be a method of delivering a signal to a terminal from a BS using a DL data channel of a physical layer or to a BS from a terminal using a UL data channel of a physical layer, and may include at least one of radio resource control (RRC) signaling, packet data convergence protocol (PDCP) signaling, or a signal delivery method through a media access control (MAC) control element (MAC CE). Furthermore, the higher layer signaling or the higher layer signal may include system information transmitted in common to a plurality of terminals, e.g., system information blocks (SIBs), and also include all information delivered through a physical broadcast channel (PBCH) except a master information block (MIB). Alternatively, the MIB may also be included in the higher layer signal.

An apparatus and method according to various embodiments of the disclosure may enable a BS and a terminal to perform more efficient communication by providing a method by which the terminal determines a resource to transmit uplink control information.

The effects that may be attained in the disclosure are not limited thereto, and throughout the specification it will be clearly appreciated by those of ordinary skill in the art that there may be other effects unmentioned.

Based on what are discussed above, the disclosure may provide a method and apparatus for determining and transmitting a resource for transmission of uplink (UL) control information (UCI) in a wireless communication system.

In an embodiment, the method, performed by the UE, of transmitting UL control information in a wireless communication system may include receiving, from a BS, downlink (DL) control information and a DL data channel scheduled by the DL control information, obtaining scheduling information for a UL data channel based on the DL control information, and reporting the UCI which is a result of receiving the DL data channel to the BS by using a transmission resource determined based on the DL control information.

FIG. 1 illustrates a wireless communication system, according to various embodiments of the disclosure. In FIG. 1, as certain nodes that use wireless channels in a wireless communication system, a BS 10, a terminal (or a UE) 120, and a terminal (or a UE) 130 may be illustrated. Although there is one BS shown in FIG. 1, another BS, which is identical or similar to the BS 110, may be further included.

The BS 110 may be a network infrastructure that provides radio access for the terminals 120 and 130. The BS 110 has coverage defined to be a certain geographical area based on a range within which a signal may be transmitted from the BS 110. The BS 110 may also be referred to as an access point (AP), an eNodeB (eNB), a gNodeB (gNB), a 5G node, a wireless point, a transmission/reception point (TRP), or other terms having equal technical meaning.

Each of the terminals 120 and 130 is a device used by a user, which may perform communication with the BS 110 through a wireless channel. In some cases, at least one of the terminal 120 or the terminal 130 may be operated without intervention of the user. For example, at least one of the terminal 120 or the terminal 130 is a device for performing machine type communication (MTC), which may not be carried by the user. Each of the terminals 120 and 130 may also be referred to as a UE, an MS, a subscriber station, a remote terminal, a wireless terminal, a user device, or other terms having equal technical meaning.

A wireless communication environment may involve wireless communication in an unlicensed band. The BS 110, the terminal 120, and the terminal 130 may transmit or receive wireless signals in an unlicensed band (e.g., 5 to 7 GHz or 64 to 71 GHz). In an embodiment, in the unlicensed band, a cellular communication system and another communication system (e.g., a wireless local area network (WLAN)) may coexist. To guarantee fairness between the two communication systems, i.e., to avoid a situation in which a channel is exclusively used by one of the systems, the BS 110, the terminal 120, and the terminal 130 may perform a channel access procedure for the unlicensed band. As an example of the channel access procedure for the unlicensed band, the BS 110, the terminal 120, and the terminal 130 may perform listen before talk (LBT).

The BS 110, the terminal 120, and the terminal 130 may transmit or receive wireless signals in a millimeter wave (mmWave) band (e.g., 28 GHz, 30 GHz, 38 GHz, or 60 GHz). In this case, to increase channel gains, the BS 110, the terminal 120, and the terminal 130 may perform beamforming. Herein, the beamforming may include transmit beamforming and receive beamforming. That is, the BS 110, the terminal 120, and the terminal 130 may give directivity to a signal to be transmitted or received. For this, the BS 110 and the terminals 120 and 130 may select serving beams through a beam search or beam management procedure. Communication after the serving beams are selected may be performed with resources having a quasi co-located (QCL) relationship with resources in which the serving beams have been transmitted.

Figure 2:
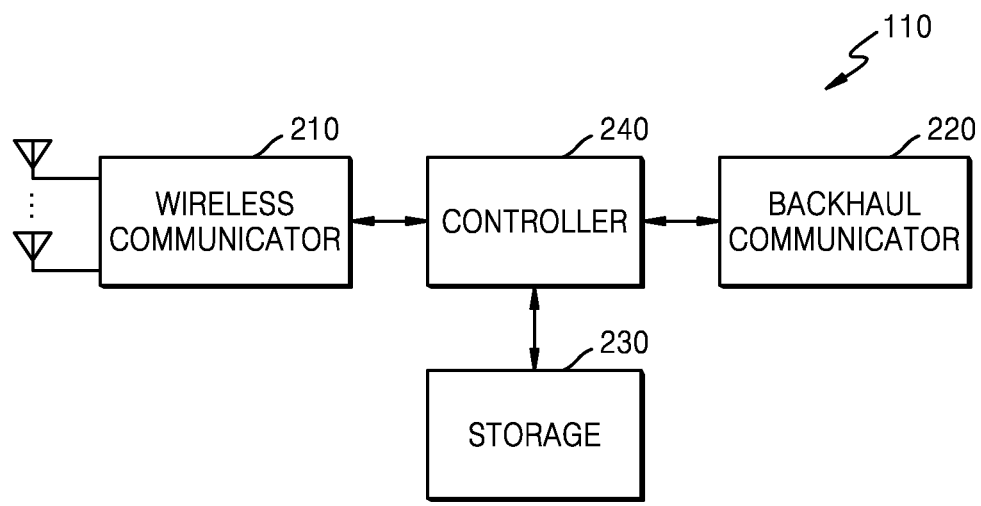
FIG. 2 illustrates a configuration of a base station (BS) in a wireless communication system, according to various embodiments of the disclosure.

FIG. 2 illustrates a configuration of a BS in a wireless communication system, according to various embodiments of the disclosure. A configuration illustrated in FIG. 2 may be understood as a configuration of the BS 110 of FIG. 1. "Unit", "module", "block", etc., used herein each represent a unit for handling at least one function or operation, and may be implemented in hardware, software, or a combination thereof.

Referring to FIG. 2, the BS may include a wireless communicator 210, a backhaul communicator 220, a storage 230, and a controller 240.

The wireless communicator 210 (which may be interchangeably used with a transceiver) may perform functions for transmitting or receiving signals through a wireless channel. For example, the wireless communicator 210 may perform a conversion function between a baseband signal and a bitstream according to a physical layer standard of the system. For example, for data transmission, the wireless communicator 210 may generate complex symbols by encoding and modulating a bitstream for transmission. Upon receiving data, the wireless communicator 210 may reconstruct a received bitstream by demodulating and decoding the baseband signal.

Furthermore, the wireless communicator 210 may perform up-conversion on the baseband signal to a radio frequency (RF) band signal and transmit the resultant signal through an antenna, and may perform down-conversion on an RF band signal received through an antenna to a baseband signal. For this, the wireless communicator 210 may include a transmit filter, a receive filter, an amplifier, a mixer, an oscillator, a digital to analog converter (DAC), an analog to digital converter (ADC), etc. The wireless communicator 210 may also include a number of transmission and reception paths. Furthermore, the wireless communicator 210 may include at least one antenna array comprised of multiple antenna elements.

From a perspective of hardware, the wireless communicator 210 may include a digital unit and an analog unit, and the analog unit may include multiple sub-units depending on operation power, operating frequency, etc. The digital unit may be implemented with at least one processor (e.g., a digital signal processor (DSP)).

The wireless communicator 210 may transmit or receive a signal as described above. All or part of the wireless communicator 210 may be referred to as a transmitter, a receiver, or a transceiver. In the following description, transmission or reception performed through a wireless channel is used as having meaning that the aforementioned processes are performed by the wireless communicator 210. In an embodiment, the wireless communicator 210 may include at least one transceiver.

The backhaul communicator 220 may provide an interface for communicating with other nodes in the network. Specifically, the backhaul communicator 220 may convert a bitstream to be transmitted from the BS to another node, e.g., another access node, another BS, a higher node, a core network, etc., into a physical signal, and may convert a physical signal received from another node into a bitstream.

The storage 230 may store a basic program for operation of the BS, an application program, data like settings information. The storage 230 may include a volatile memory, a non-volatile memory, or a combination of the volatile memory and the non-volatile memory. The storage 230 may provide stored data at the request of the controller 240. In an embodiment, the storage 230 may include a memory.

The controller 240 may control general operations of the BS. For example, the controller 240 may transmit or receive a signal through the wireless communicator 210 or the backhaul communicator 220. The controller 240 may record data to the storage 230 or read out data from the storage 230. The controller 240 may also perform functions of a protocol stack requested by a communication standard. In an embodiment, the protocol stack may be included in the wireless communicator 210. In an embodiment, the controller 240 may include at least one processor.

In various embodiments, the controller 240 may control the BS to operate according to various embodiments, which will be described later. For example, the controller 240 may perform a channel access procedure for an unlicensed band. For example, a transceiver (e.g., the wireless communicator 210) may receive signals transmitted in the unlicensed band, and the controller 240 may determine whether the unlicensed band is in an idle state by comparing strength of the received signal with a set threshold or a value of a function defined in advance or having a factor such as bandwidth. Furthermore, for example, the controller 240 may transmit a control signal to a terminal or receive a control signal from a terminal through the transceiver. Moreover, the controller 240 may transmit data to a terminal or receive data from a terminal through the transceiver. The controller 240 may determine a transmission result of a signal transmitted to the terminal, based on a control signal or a data signal received from the terminal.

Furthermore, for example, the controller 240 may maintain or change a contention window (hereinafter, adjust a contention window) for a channel access procedure, based on the transmission result, i.e., a reception result of the control signal, or data signal at the terminal. In various embodiments of the disclosure, the controller 240 may determine a reference slot for obtaining the transmission result for the contention window adjustment. The controller 240 may determine a data channel for the contention window adjustment in the reference slot. The controller 240 may determine a reference control channel for the contention window adjustment in a reference slot. When an unlicensed band is determined to be in an idle state, the controller 240 may occupy the channel.

Furthermore, according to what are described in the disclosure, the controller 240 may receive UL control information from the terminal through the wireless communicator 210, and control to determine whether retransmission is required for a DL data channel and/or whether there is a need for changing the modulation and coding scheme, based on one or more of HARQ-ACK information or channel state information (CSI) included in the UL control information (UCI). Moreover, the controller 240 may generate DL control information (DCI) to schedule initial transmission or retransmission of DL data or request UL control information transmission, and control the wireless communicator 210 to transmit the DCI to the terminal. Furthermore, the controller 240 may control the wireless communicator 210 to receive UL data and/or UCI (re)transmitted according to the DCI.

Figure 3:
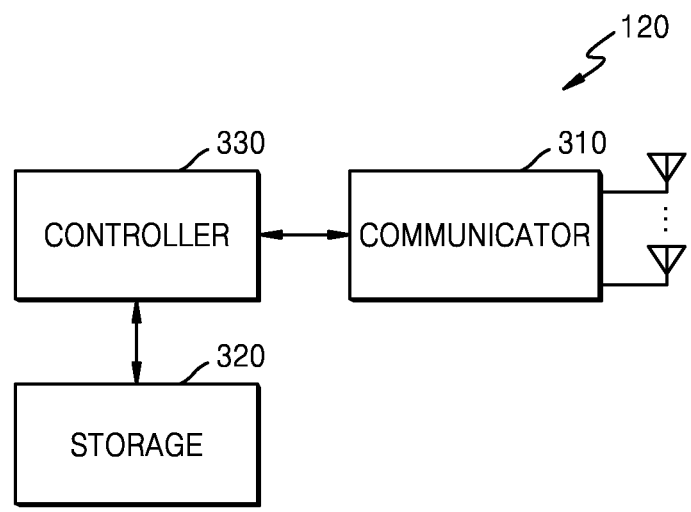
FIG. 3 illustrates a configuration of a user equipment (UE) in a wireless communication system, according to various embodiments of the disclosure.

FIG. 3 illustrates a configuration of a terminal in a wireless communication system, according to various embodiments of the disclosure. A configuration illustrated in FIG. 3 may be understood as a configuration of the terminal 110 or 120 of FIG. 1. "Unit", "module", "block", etc., used herein each represent a unit for handling at least one function or operation, and may be implemented in hardware, software, or a combination thereof.

Referring to FIG. 3, a terminal may include a communicator 310, a storage 320, and a controller 330.

The communicator 310 (which may be interchangeably used with a transceiver) may perform functions for transmitting or receiving signals through a wireless channel. For example, the communicator 310 may perform a conversion function between a baseband signal and a bitstream according to a physical layer standard of the system. For example, for data transmission, the communicator 310 may generate complex symbols by encoding and modulating a bitstream for transmission. Upon receiving data, the communicator 310 may reconstruct a received bitstream by demodulating and decoding the baseband signal. Furthermore, the communicator 310 may perform up-conversion on the baseband signal to an RF band signal and transmit the resultant signal through an antenna, and may perform down-conversion on an RF band signal received through the antenna to a baseband signal. For example, the communicator 310 may include a transmit filter, a receive filter, an amplifier, a mixer, an oscillator, a digital-to-analog converter (DAC), an analog-to-digital converter (ADC), etc.

The communicator 310 may also include a number of transmission and reception paths. Furthermore, the communicator 310 may include at least one antenna array comprised of multiple antenna elements. From the perspective of hardware, the communicator 310 may be comprised of a digital circuit and an analog circuit (e.g., a radio frequency integrated circuit (RFIC)). In this case, the digital circuit and the analog circuit may be implemented in a single package. The communicator 310 may include multiple RF chains. Furthermore, the communicator 310 may perform beamforming.

The communicator 310 may transmit or receive a signal as described above. All or part of the communicator 310 may be referred to as a transmitter, a receiver, or a transceiver. In the following description, transmission or reception performed through a wireless channel is used as having meaning that the aforementioned processes are performed by the communicator 310. In an embodiment, the wireless communicator 310 may include at least one transceiver.

The storage 320 may store a basic program for operation of the terminal, an application program, data like settings information. The storage 320 may include a volatile memory, a non-volatile memory, or a combination of the volatile memory and the non-volatile memory. The storage 320 may provide stored data at the request of the controller 330. In an embodiment, the storage 320 may include a memory.

The controller 330 may control general operations of the terminal. For example, the controller 330 may transmit or receive a signal through the communicator 310. The controller 330 may also record or read data onto or from the storage 320. The controller 330 may further perform functions of a protocol stack requested by a communication standard. For this, the controller 330 may include at least one processor or microprocessor, or may be part of the processor. In an embodiment, the controller 330 may include at least one processor. Furthermore, in an embodiment of the disclosure, a portion of the communicator 310 and/or the controller 330 may be referred to as a communication processor (CP).

In various embodiments, the controller 330 may control the terminal to operate according to various embodiments, which will be described later. For example, the controller 330 may receive a DL signal (a DL control signal or DL data) transmitted by the BS through the transceiver (e.g., the communicator 310). Furthermore, for example, the controller 330 may determine a transmission result of the DL signal. The transmission result may include feedback information such as acknowledgment (ACK), negative ACK (NACK), discontinuous transmission (DTX), etc., of the transmitted DL signal. In the disclosure, the transmission result may be called by various terms such as a reception state, reception result, decoding result, HARQ-ACK information, etc., of the DL signal. Furthermore, for example, the controller 330 may transmit a UL signal to the BS through the transceiver in response to a DL signal. The UL signal may explicitly or implicitly include the transmission result of the DL signal. Furthermore, for example, the controller 330 may transmit UCI to the BS through the transceiver, the UCI including at least one or more of the aforementioned HARQ-ACK information and/or channel state information (CSI). The UCI may be transmitted to the BS in a UL data channel with or without UL data information.

The controller 330 may perform a channel access procedure for an unlicensed band. For example, a transceiver (e.g., the communicator 310) may receive signals transmitted in the unlicensed band, and the controller 330 may determine whether the unlicensed band is in an idle state by comparing strength of the received signal with a set threshold or a value of a function defined in advance or having a factor such as bandwidth. The controller 330 may perform an access procedure for the unlicensed band to transmit a signal to the BS. Furthermore, the controller 330 may use at least one of a result of performing the channel access procedure and the DL control information received from the BS to determine a UL transmission resource for transmitting the UCI, and transmit the UCI to the BS through the transceiver.

Figure 4:
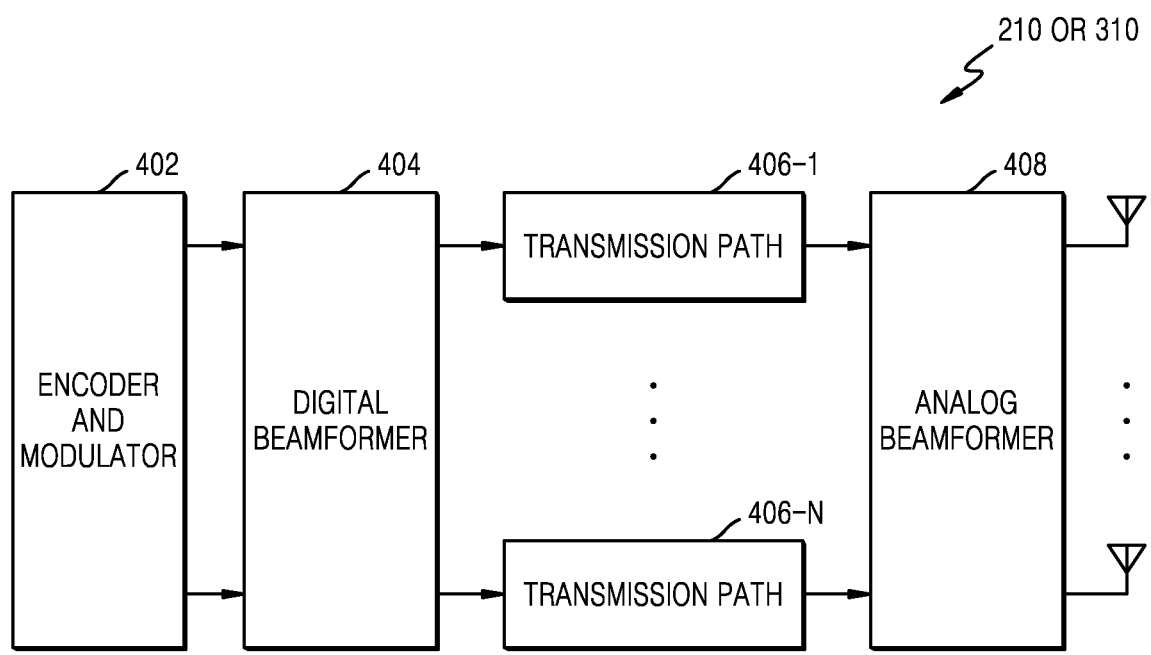
FIG. 4 illustrates a configuration of a communication module in a wireless communication system, according to various embodiments of the disclosure.

FIG. 4 illustrates a configuration of a communicator in a wireless communication system, according to various embodiments of the disclosure. In FIG. 4, an example of a detailed configuration of the wireless communicator 210 of FIG. 2 or the communicator 310 of FIG. 3 may be illustrated. Specifically, components, which are parts of the wireless communicator 210 of FIG. 2 or the communicator 310 of FIG. 3, involved in performing beamforming may be illustrated in FIG. 4.

Referring to FIG. 4, the wireless communicator 210 or the communicator 310 may include an encoder and modulator 402, a digital beamformer 404, multiple transmission paths 406-1 to 406-N, and an analog beamformer 408.

The encoder and modulator 402 may perform channel encoding. For channel encoding, at least one of low density parity check (LDPC) codes, convolution codes, or polar codes may be used. The encoder and modulator 402 may generate modulated symbols by performing constellation mapping.

The digital beamformer 404 may perform beamforming on a digital signal (e.g., modulated symbols). For this, the digital beamformer 404 may multiply the modulated symbols by beamforming weights. The beamforming weights may be used to change magnitude and phase of a signal, and referred to as a precoding matrix, a precoder, etc. The digital beamformer 404 may output digitally beamformed modulated symbols on the multiple transmission paths 406-1 to 406-N. In this case, according to a multiple input multiple output (MIMO) transmission scheme, the modulated symbols may be multiplexed or the same modulated symbols may be provided on the multiple transmission paths 406-1 to 406-N.

The multiple transmission paths 406-1 to 406-N may convert digitally beamformed digital signals to analog signals. For this, the multiple transmission paths 406-1 to 406-N may each include an inverse fast Fourier transform (IFFT) operator, a cyclic prefix (CP) inserter, a DAC, and an up-converter. The CP inserter is for an OFDM scheme, and may be omitted when a different physical layer scheme (e.g., a filter bank multi-carrier (FBMC) scheme) is applied. In other words, the multiple transmission paths 406-1 to 406-N may provide independent signal processing processes on multiple streams generated through digital beamforming. However, depending on implementation methods, some of the components of the multiple transmission paths 406-1 to 406-N may be shared.

The analog beamformer 408 may perform beamforming on an analog signal. For this, the analog beamformer 408 may multiply analog signals by beamforming weights. The beamforming weights may be used to change magnitude and phase of the signal. Specifically, depending on a coupling structure between the multiple transmission paths 406-1 to 406-N and antennas, the analog beamformer 408 may be variously configured. For example, each of the multiple transmission paths 406-1 to 406-N may be connected to an antenna array. For example, the multiple transmission paths 406-1 to 406-N may be connected to an antenna array. In another example, the multiple transmission paths 406-1 to 406-N may be adaptively connected to one, two, or more antenna arrays.

In the 5G system, considering various services and requirements, a frame structure for the 5G system needs to be flexibly defined. For example, each service may have a different subcarrier spacing (SCS) depending on a requirement. Modern 5G communication systems may support a plurality of SCSs, and an SCS may be determined in the following equation 1:

$$\Delta f = f_0 2^m \quad \text{[Equation 1]}$$

In the equation 1, $f_0$ indicates a default SCS of the system, m indicates a scaling factor of integers, and $\Delta f$ indicates an SCS. For example, assuming that $f_0$ is 15 kHz, a set of SCSs that the 5G communication system is able to have may be comprised of one of 3.75 kHz, 7.5 kHz, 15 kHz, 30 kHz, 60 kHz, 120 kHz, 240 kHz, and 480 kHz. An available SCS set may differ by the frequency band. For example, for frequency bands at or under 7 GHz, at least one SCS of 3.75 kHz, 7.5 kHz, 15 kHz, 30 kHz, or 60 kHz may be used, and for frequency bands above 7 GHz, at least one SCS of 60 kHz, 120 kHz, 240 kHz or above may be used.

In various embodiments, depending on the SCS that makes up an OFDM symbol, length of the OFDM symbol may be changed. This is because the SCS and the length of the OFDM symbol have a reciprocal relation to each other as properties of the OFDM symbol. For example, when the SCS is doubled, the symbol length may be reduced to half, and when the SCS is reduced to half, the symbol length may be doubled.

Figure 5:
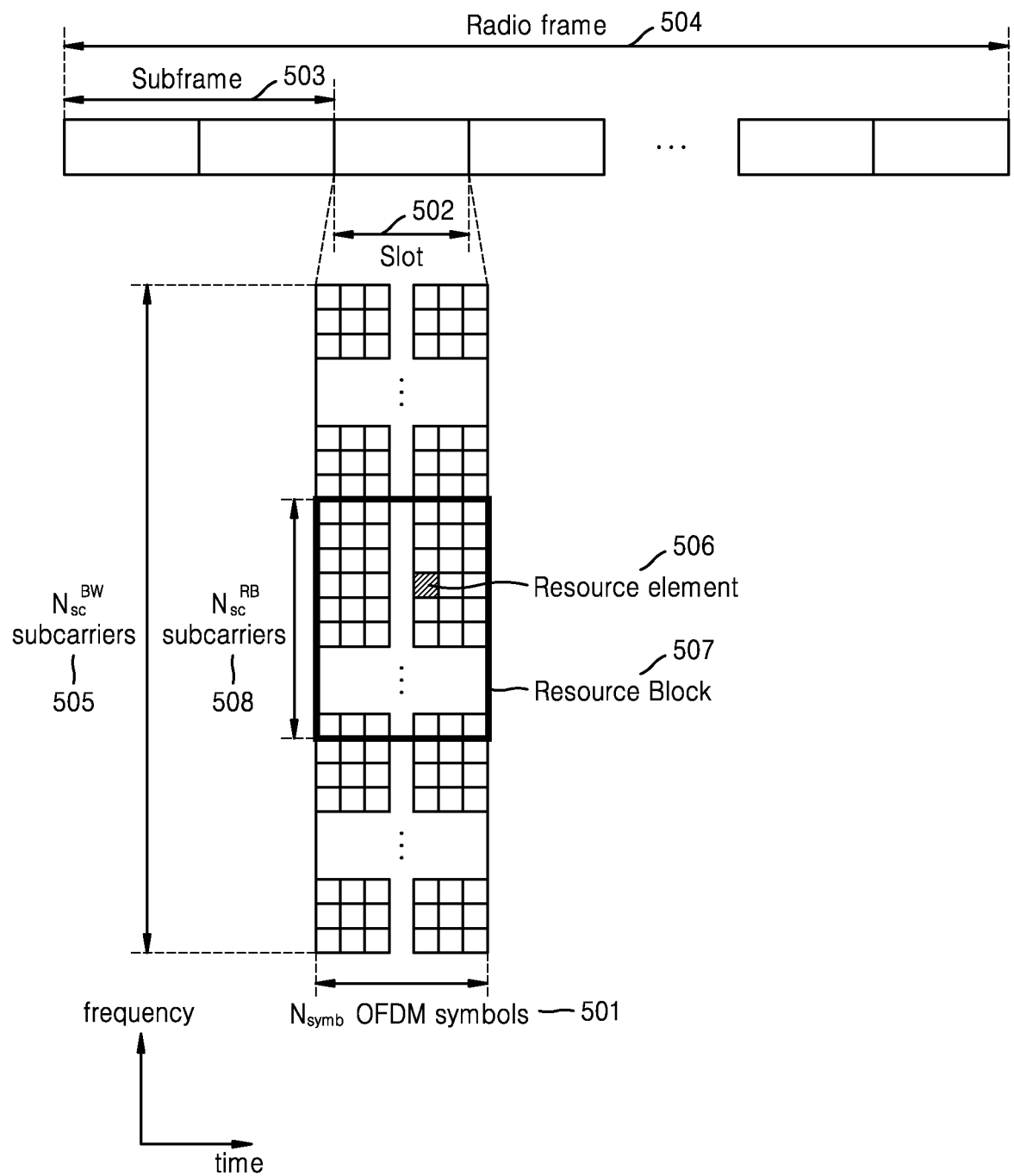
FIG. 5 illustrates an example of a radio resource region in a wireless communication system, according to various embodiments of the disclosure.

FIG. 5 illustrates an example of a radio resource region in a wireless communication system, according to various embodiments of the disclosure. In various embodiments, a radio resource region may have a structure of the time-frequency domain. In various embodiments, the wireless communication system may include an NR communication system.

Referring to FIG. 5, in the radio resource region, the horizontal axis represents the time domain, and the vertical axis represents the frequency domain. A minimum transmission unit in the time domain may be an orthogonal frequency division multiplexing (OFDM) and/or discrete Fourier transform-spread-OFDM (DFT-s-OFDM) symbol, and $N_{symb}$ OFDM and/or DFT-s-OFDM symbols 501 may make up a slot 502. In various embodiments, the OFDM symbol may include a symbol for a case of transmitting or receiving a signal using an OFDM multiplexing scheme, and the DFT-s-OFDM symbol may include a symbol for a case of transmitting or receiving a signal using a single carrier frequency division multiple access (SC-FDMA) multiplexing scheme. An embodiment of the disclosure based on the OFDM symbol will now be described for convenience of explanation, but it may be fully understood by those of ordinary skill in the art that a DFT-s-OFDM symbol based embodiment may also be applied. Furthermore, an embodiment of the disclosure for DL signal transmission or reception will be described for convenience of explanation, but another embodiment of the disclosure for UL signal transmission or reception will also be applied.

When the SCS is 15 kHz, unlike what is shown in FIG. 5, the one slot 502 makes up a subframe 503, and the slot 502 and the subframe 503 may each be 1 ms long. In various embodiments, the number of slots making up the one subframe 503 and the slot length may be different depending on the SCS. For example, when the SCS is 30 kHz, two slots may make up the one subframe 503. In this case, the slot may be 0.5 ms long, and the subframe 503 may be 1 ms long. The radio frame 504 may be a time domain region made up with 10 subframes. A minimum transmission unit in the frequency domain is a subcarrier, and carrier bandwidth that makes up resource grid may be comprised of a total of $N_{SC}^{BW}$ subcarriers 505.

The SCS, the number of slots 502 included in the subframe 503, the length of the slot 502, however, may be variably applied. For example, for an LTE system, the SCS is 15 kHz and two slots make up the one subframe 503, in which case the slot 502 may be 0.5 ms long and the subframe 503 may be 1 ms long. In another example, for an NR system, the SCS ($\mu$) may be one of 15 kHz, 30 kHz, 60 kHz, 120 kHz, and 240 kHz, and the number of slots included in one subframe may be 1, 2, 4, 8, or 16 depending on the SCS ($\mu$).

In the time-frequency domain, a default resource unit may be a resource element (RE) 506, and the RE 506 may be represented with an OFDM symbol index and a subcarrier index. A resource block may include a plurality of REs. In an LTE system, the resource block (RB) or physical resource block (PRB) 507 may be defined by $N_{symb}$ consecutive OFDM symbols 501 in the time domain and $N_{SC}^{RB}$ consecutive subcarriers 508 in the frequency domain. The number of symbols included in one RB may be $N_{symb}=14$, and the number of subcarriers may be $N_{SC}^{RB}=12$, or the number of symbols included in one RB may be $N_{symb}=7$ and the number of subcarriers may be $N_{SC}^{RB}=12$. The number of RBs may vary depending on bandwidth of the system transmission band.

In an NR system, the RB 507 may be defined by $N_{SC}^{RB}$ consecutive subcarriers in the frequency domain. The number of subcarriers may be $N_{SC}^{RB}=12$. The frequency domain may include common resource blocks (CRBs), and a PRB may be defined in a bandwidth part (BWP) in the frequency domain. Different CRB and PRB numbers may be determined depending on the SCS.

DL control information may be transmitted in first N OFDM symbols in a slot. In general, N may be N={1, 2, 3}, and the terminal may be configured with the number of symbols in which DL control information may be transmitted from the BS through higher layer signaling. Furthermore, depending on an amount of control information to be transmitted in a current slot, the BS may change the number of symbols in which the DL control information may be transmitted for each slot, and transmit information about the number of symbols to the terminal through a separate DL control channel.

In the NR and/or LTE system, scheduling information for DL data or UL data is transmitted through downlink control information (DCI) from the BS to the terminal. In various embodiments, the DCI may be defined in various formats, each format being changed according to whether the DCI includes scheduling information for UL data (UL grant) or scheduling information for DL data (DL grant), whether the DCI corresponds to compact DCI with a small size of control information or fall-back DCI, whether spatial multiplexing with multiple antennas is applied, and/or whether the DCI corresponds to DCI for power control.

For example, a DCI format (e.g., DCI format 1_0 of NR) corresponding to scheduling control information (DL grant) for DL data may include at least one of the following pieces of control information:

DCI format identifier: an identifier for identifying a format of the DCI frequency domain resource allocation: indicates an RB allocated for data transmission time domain resource allocation: indicates slots and symbols allocated for data transmission VRB-to-PRB mapping: indicates whether to apply a virtual resource block (VRB) mapping scheme Modulation and coding scheme (MCS): indicates the size of a transport block (TB) that is data to be transmitted and modulation scheme used for data transmission New data indicator (NDI): indicates whether it is HARQ initial transmission or retransmission Redundancy version (RV): indicates a redundancy version of HARQ.

HARQ process number: indicates a process number of HARQ.

Physical downlink shared channel (PDSCH) assignment index (or downlink assignment index): indicates the number of PDSCH reception results to be reported from the UE to the BS (e.g., the number of HARQ-ACKs)

Transmit Power Control (TPC) command for Physical Uplink Control CHannel (PUCCH): indicates transmit power control command for an uplink control channel, PUCCH PUCCH resource indicator: indicates a PUCCH resource used in reporting HARQ-ACK that includes a reception result of a PDSCH configured through the DCI PUCCH transmit timing indicator (or PDSCH-to-HARQ_feedback timing indicator): indicates information about a slot or a symbol in which to transmit a PUCCH for reporting HARQ-ACK including a reception result of a PDSCH configured through the DCI The DCI may be transmitted via a physical downlink control channel (PDCCH) or an enhanced PDCCH (EPDCCH) after going through channel coding and modulation processes. Hereinafter, transmission or reception of a PDCCH or EPDCCH may be understood as DCI transmission or reception via the PDCCH or EPDCCH, and transmission or reception of a PDSCH may be understood as DL data transmission or reception via the PDSCH.

In various embodiments, a cyclic redundancy check (CRC) scrambled by a particular radio network temporary identifier (RNTI) or a cell RNTI (C-RNTI) that is independent for each terminal, may be added to the DCI. DCI for each terminal may go through channel coding, and may be configured into an independent PDCCH and transmitted. In the time domain, the PDCCH may be transmitted during a control channel transmission interval. In the frequency domain, a mapping position of the PDCCH may be determined by at least an identifier (ID) of each terminal, and may be transmitted in the entire system transmission band or a configured frequency band of the system transmission band. Alternatively, in the frequency domain, a mapping position of the PDCCH may be configured by higher layer signaling.

DL data may be transmitted on a PDSCH, which is a physical channel for DL data transmission. The PDSCH may be transmitted after a control channel transmission interval, and in the frequency region, scheduling information such as a mapping position of the PDSCH and a modulation scheme for the PDSCH may be determined based on DCI transmitted through a PDCCH.

Through modulation and coding scheme (MCS) information among the control information making up the DCI, the base station may notify the terminal of a modulation scheme applied to the PDSCH to be transmitted and the size of data to be transmitted (transport block size; TBS). In various embodiments of the disclosure, an MCS may be configured of 5 bits or more than or less than 5 bits. The TBS may correspond to the size of a TB before channel coding for error correction is applied to the data (TB) to be transmitted by the BS.

In an NR system, a modulation scheme supported for UL and DL data transmission may include at least one of quadrature phase shift keying (QPSK), 16 quadrature amplitude modulation (16QAM), 64QAM, or 256QAM, and each modulation order $Q_m$ may be 2, 4, 6, or 8. For example, two bits per symbol may be transmitted for QPSK modulation, 4 bits per symbol for 16QAM modulation, 6 bits per symbol for 64QAM modulation, and 8 bits per symbol for 256QAM modulation. Furthermore, a modulation scheme above 256QAM may be used according to a system modification.

Data, i.e., a TB or a codeword CW, transmitted in a DL or a UL may be divided into one or more code blocks (CBs).

Figure 6:
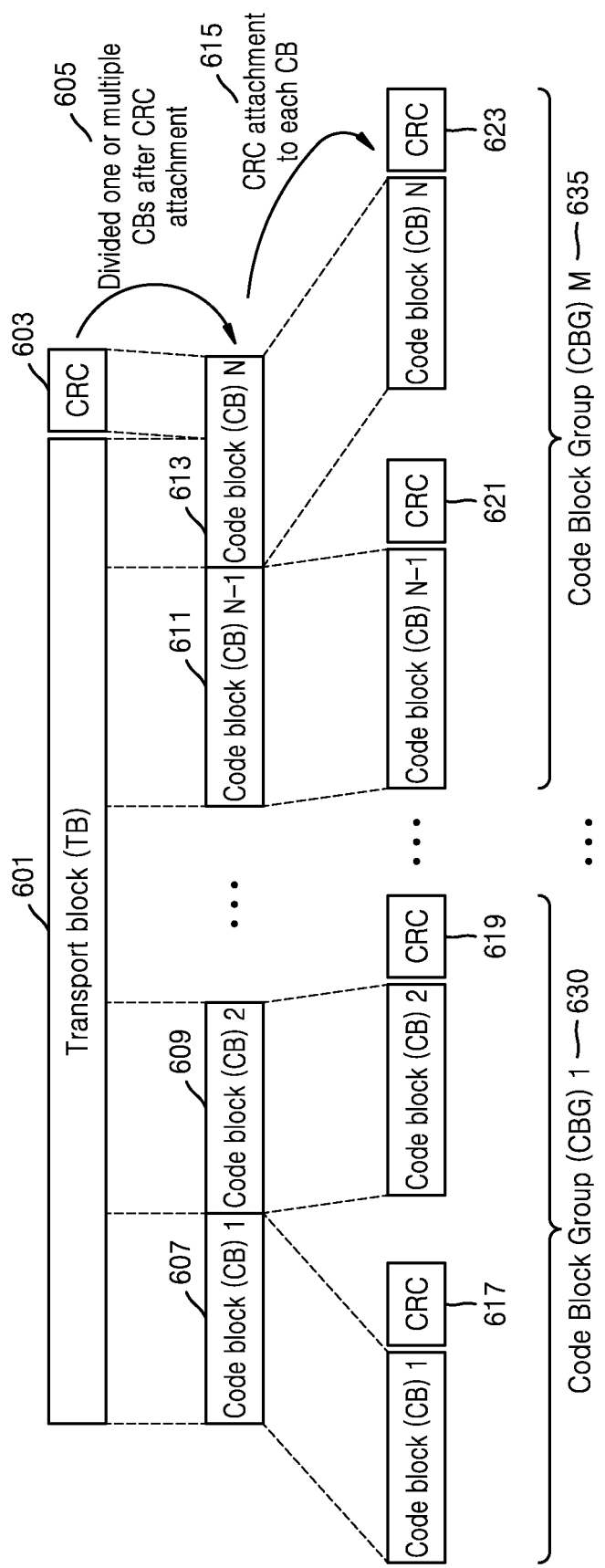
FIG. 6 illustrates an example of a code block group structure in a wireless communication system, according to various embodiments of the disclosure.

FIG. 6 illustrates an example of a code block group structure in a wireless communication system, according to various embodiments of the disclosure. Referring to FIG. 6, data or a TB 601 to be transmitted in a UL or a DL may have cyclic redundancy check (CRC) 603 added thereto at the first or last portion. Upon receiving the data, a terminal or a BS may determine whether the TB 601 has been correctly received based on the CRC 603. The CRC 603 may be in 16 or 24 bits, or in a prefixed number of bits, or in a variable number of bits depending on the channel state, and may be used to determine whether channel coding is successful. A block with the TB 601 and the CRC 603 added thereto may be divided into multiple CBs 607, 609, 611, and 613, in 605.

In this case, the TB 601 may be divided by a maximum CB size defined in advance, or a maximum CB size configured by a higher layer signal from the BS. Hence, at least one of the first CB 607 or the last CB 613 may have a smaller size than the other CB. In this case, the first CB 607 or the last CB 613 may be filled in with 0's, random values or 1's until having the same length as the other CB. In an embodiment, CRCs 617, 619, 621, and 623 may be added to the one or more separate CBs, respectively, in 615. The CRC may be in 16 or 24 bits, or in a prefixed number of bits, or in a variable number of bits, and may be used to determine whether channel coding is successful.

The CRC 603 added to the TB and the CRCs 617, 619, 621, and 623 added to the CBs may be omitted depending on a type of a channel code to be applied to the CBs. For example, when LDPC codes are applied to the CBs instead of turbo codes, all or some of the CRCs 617, 619, 621, and 623 that would otherwise be inserted to every CB may be omitted. In this case, omission of some of the CRCs means reduction in CRC length. However, even when the LDPC codes are applied to CBs, the CRCs 617, 619, 621, and 623 may be added to the CBs as they are. Moreover, even when polar codes are used, the CRCs may be added or omitted.

Furthermore, one or more CBs may form a code block group (CBG). In this case, the BS may configure, in a higher layer signal, the terminal to group one TB with up to M CBGs. Referring to FIG. 6, for example, when the terminal is configured in the higher layer signal from the BS to have up to M CBGs for one TB, the terminal may regroup the TB divided into N CBs with M CBGs 630 and 635. In this case, the number of CBs included in one CBG may vary depending on the size of the TB. In other words, as the number of CBs is different depending on the size of the TB, the number of CBs included in the CBG may be different as well. For example, when the TB is divided into M CBs, one CBG may be comprised of one CB. When the TB is divided into 2M CBs, one CBG may be comprised of two CBs. That is, the number of CBs included in one CBG may be changed depending on the number of CBs that constitute the TB.

In this case, the terminal configured to determine that a codeword or a TB transmitted or received in a DL data channel is divided into one or more CBGs (e.g., M CBGs, where M is a positive integer equal to or greater than 1) may transmit a DL reception result for each CBG (of M CGBs) configured or divided as described above to the BS via a UL control channel (PUCCH) or a UL data channel (PUSCH). At this time, the aforementioned DCI that schedules the DL data channel may include CBG transmission information (CBGTI) to indicate which CBG has been transmitted, and the CBGTI field may be comprised of a bitstream formed of the maximum number (M) of CBGs for each TB as configured above.

The terminal may determine CBGs actually transmitted by the BS in the DL data channel based on the field. For example, in the case of M=4, the terminal may receive DCI that schedules retransmission of the DL data. When the CBGTI field of the DCI has a value of e.g., 0011, the terminal may determine that (data corresponding to) the third and fourth CBGs of CBGs constituting the TB have been transmitted in the DL data channel. As for the DCI that schedules initial transmission of the DL data, the terminal may receive DL data corresponding to all the CBGs in the DL data channel.

The terminal configured to determine that a codeword or a TB transmitted or received in a UL data channel is divided into one or more CBGs (e.g., M CBGs, where M is a positive integer equal to or greater than 1) may determine the UL reception result of the BS for each CBG (of M CGBs) divided as described above in the following method.

The BS may transmit, to the terminal, DL control information (UL grant) to configure or schedule UL data transmission. For example, in a case that an NDI included in the DCI is toggled (NDI toggling), the DCI may be interpreted as scheduling new data, and in a case that the NDI is not toggled, the DCI may be interpreted as scheduling data retransmission. Alternatively, the BS may transmit, to the terminal, the UL reception result of the BS for the separate CBG (of M CBGs) in separate control information or a channel. In this case, as in the aforementioned case of DL data channel, the BS may transmit, to the terminal, CBGTI indicating which CBG is to be transmitted by the terminal, through the DCI that schedules UL data channel transmission.

Similar to the DL, the CBGTI may be formed of a bitstream comprised of the maximum number of CBGs for each TB configured as described above, and the terminal may determine a CBG requested by the BS to be actually transmitted in the UL data channel. For example, in the case of M=4, the terminal may receive DCI that schedules retransmission of UL data. When the CBGTI field of the DCI has a value of e.g., 0011, the terminal may transmit (data corresponding to) the third and fourth CBGs of CBGs constituting the TB in a UL data channel. As for the DCI that schedules initial transmission of UL data, the terminal may transmit UL data corresponding to all the CBGs in the UL data channel.

Figure 7:
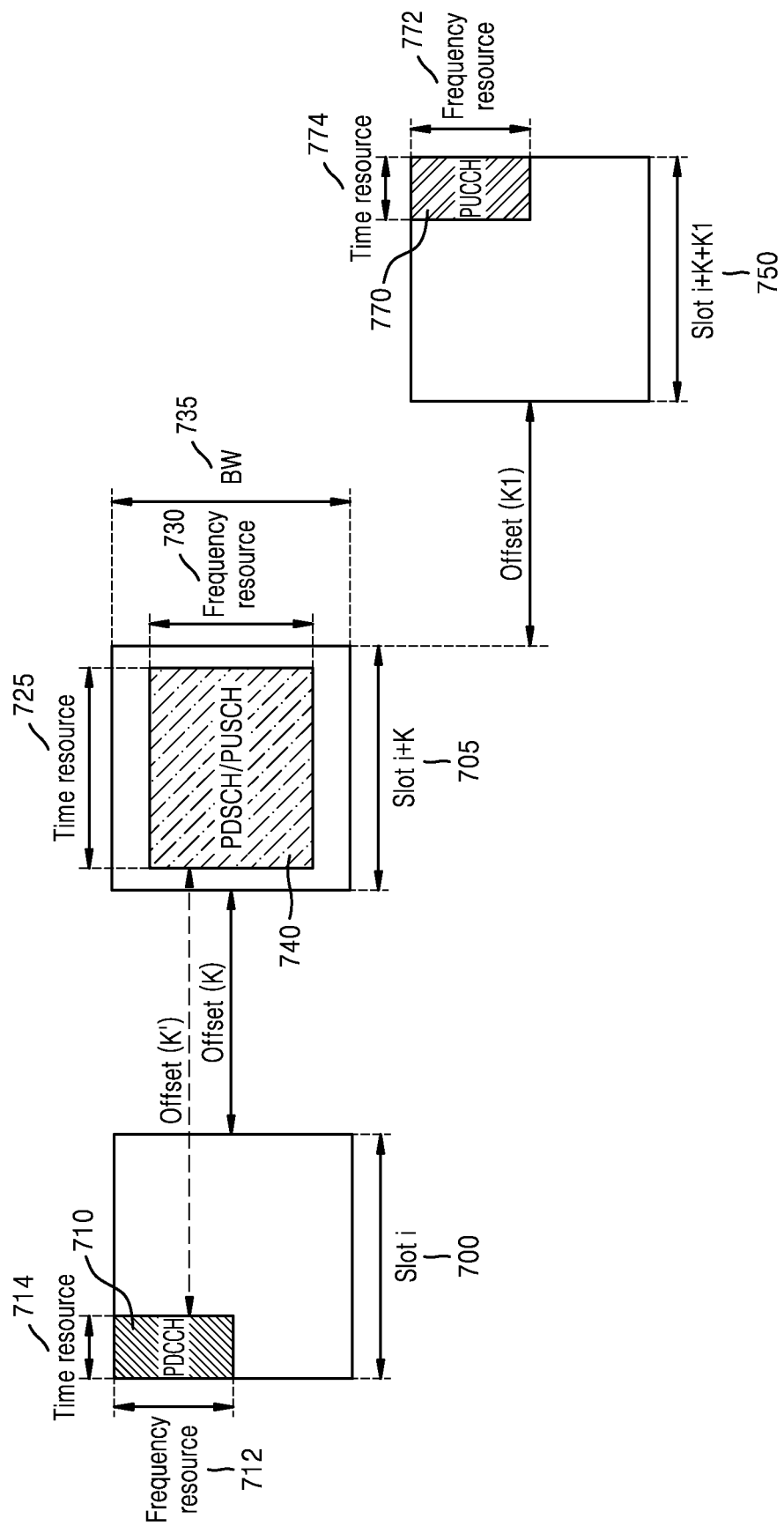
FIG. 7 illustrates an example of scheduling and feedback in a wireless communication system, according to various embodiments of the disclosure.

FIG. 7 illustrates an example of scheduling and feedback in a wireless communication system, according to various embodiments of the disclosure. Referring to FIG. 7, the BS may transmit control information that includes scheduling information for a DL and/or UL data channel to the terminal. The BS may transmit DL data to the terminal according to the scheduling information. Upon reception of the DL data, the terminal may transmit HARQ-ACK information, which is feedback for the DL data, to the BS. Or, the terminal may transmit UL data to the BS according to the scheduling information. Upon reception of the data, the BS may transmit HARQ-ACK information, which is feedback for the UL data, to the terminal, and the feedback may be determined by the terminal based on an NDI of the scheduling information for the UL data channel or a new data indicator value.

In an NR system, a UL and DL HARQ scheme may include an asynchronous HARQ scheme in which data retransmission time is not fixed. For example, for a DL, when the BS is fed back with NACK as a result of the terminal receiving DL data transmitted by the BS, the BS may freely determine a time to retransmit the DL data according to a BS scheduling operation. Upon reception of DL data retransmission scheduling from the BS, the terminal may buffer data determined to be an error as a result of decoding the received data for HARQ operation with previously received DL data, and then perform combining with retransmitted data from the BS. The BS may be the BS 110 of FIG. 1, and the terminal may be the terminal 120 or 130 of FIG. 1.

Referring to FIG. 7, a resource region in which a data channel is transmitted in a 5G or NR communication system is illustrated. The terminal may monitor and/or search a PDCCH 710 in a DL control channel (hereinafter, a PDCCH) region (hereinafter, control resource set (CORESET)) or search space (SS) configured by the BS through a higher layer signal. In this case, the DL control channel region includes a time resource 714 and a frequency resource 712, and the time resource 714 may be configured in symbols, and the frequency resource 712 may be configured in RBs or RBGs.

When the terminal detects the PDCCH 710 in slot i 700, the terminal may obtain DCI transmitted in the detected PDCCH 710. Through the received DCI, the terminal may obtain scheduling information for a DL data channel or UL data channel 740. In other words, the DCI may include at least one of time-frequency resource region (or PDSCH transmission region) information for the terminal to receive a DL data channel (hereinafter, a PDSCH) transmitted from the BS, or time-frequency resource region information allocated from the BS to the terminal for UL data channel (PUSCH) transmission.

An example of an occasion when the terminal is scheduled with the PUSCH transmission will now be described. Upon reception of the DCI, the terminal may obtain a slot index or offset information K at which to transmit a PUSCH in the DCI, and determine a PUSCH transmission slot index. For example, the terminal may determine itself as having been scheduled to transmit a PUSCH in slot i+K 705 through the received offset information K based on the slot index i 700 in which the PDCCH 710 is received. In this case, the terminal may determine the slot i+K 705 or a PUSCH start symbol or time in the slot i+K 705 through the received offset information K based on a CORESET in which the PDCCH 710 has been received.

The terminal may also obtain, from the DCI, information about the PUSCH transmission time-frequency resource region 740 in the PUSCH transmission slot 705. Information for configuring a PUSCH transmission frequency resource region 730 may include physical resource block (PRB) or PRB group-based information. In the meantime, the information for configuring the PUSCH transmission frequency resource region 730 may be information about a region included in initial UL bandwidth (BW) or an initial UL bandwidth part (BWP) determined or configured for the terminal through an initial access procedure. When the terminal is configured with UL BW or a UL BWP through a higher layer signal, the information for configuring the PUSCH transmission frequency resource region 730 may be information about a region included in the UL BW or the UL BWP configured through the higher layer signal.

In various embodiments, information for configuring a PUSCH transmission time resource region 725 may be information indicating symbol- or symbol group-based information or absolute time information. The information for configuring the PUSCH transmission time resource region 725 may be represented by a combination of a PUSCH transmission start time or symbol, PUSCH length, or a PUSCH transmission completion time or symbol, and may be included as a field or a value in the DCI. The terminal may transmit a PUSCH in the PUSCH transmission resource region 740 determined through the DCI. In an embodiment, what is described above may also be applied to a DL data channel (PDSCH) that transmits DL data.

In various embodiments, upon reception of the PDSCH 740, the terminal may give feedback with a result of reception of the PDSCH 740 (e.g., HARQ-ACK/NACK) to the BS. In this case, a resource for transmitting UL control channel (i.e., PUCCH 770) that transmits the result of reception of the PDSCH 740 (i.e., UL control information) may be determined by the terminal based on a PDSCH-to-HARQ timing indicator and a PUCCH resource indicator indicated through the DCI 710 that schedules the PDSCH 740. In other words, the terminal, upon reception of the PDSCH-to-HARQ timing indicator K1 through the DCI 710, may transmit the PUCCH 770 in slot i+K+K1 750 after K1 from the slot 705 in which the PDSCH 740 is received.

The BS may configure one or more K1 values for the terminal through higher layer signaling, or indicate a particular K1 value to the terminal through DCI as described above. K1 may be determined according to HARQ-ACK processing capability of the terminal, i.e., a minimum time required for the terminal to receive the PDSCH and generate and report HARQ-ACK for the PDSCH. The terminal may also use a predefined value or a default value for the K1 value until configured with the K1 value. In this case, a time for the terminal to transmit the result of reception of the PDSCH (HARQ-ACK) for the PDSCH may not be indicated through one of the K1 value or a non-numerical value defined in advance or configured through a higher layer signal.

Transmission of the PUCCH 770 in the PUCCH transmission slot 750 may be performed in a resource indicated through the PDCCH resource indicator in the DCI 710. In this case, when a plurality of PUCCH transmissions are configured or indicated in the PUCCH transmission slot 750, the terminal may perform PUCCH transmission in a PUCCH resource other than the resource indicated through the PUCCH resource indicator in the DCI 710.

In a 5G communication system, to dynamically change DL signal transmission and UL signal transmission intervals in a time division duplex (TDD) system, whether OFDM symbols that make up one slot are each a DL symbol, a UL symbol, or a flexible symbol may be indicated by a slot format indicator (SFI). A symbol indicated as the flexible symbol may refer to one which is not either the DL symbol or the UL symbol, or which may be changed to a DL or UL symbol based on UE-specific control information or scheduling information. The flexible symbol may include a gap guard required in a procedure of being switched from DL to UL.

The slot format indicator may be transmitted to multiple terminals through a terminal group (or cell) common control channel, simultaneously. In other words, the slot format indicator may be transmitted in a PDCCH which is CRC scrambled by a UE-specific identifier (C-RNTI) and another identifier (e.g., SFI-RNTI). In various embodiments, the slot format indicator may include information about N slots, where N is an integer or a natural number greater than 0, or may be a value set by the BS for the terminal in a higher layer signal among a set of predefined available values, such as 1, 2, 5, 10, 20, etc. Furthermore, the size of the slot format indicator information may be configured by the BS for the UE in a higher layer signal. An example of slot formats that may be indicated by the slot format indicator may be shown in the following Table 1.

TABLE 1

| For-mat | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | F | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | F | F | U | D | D | D | F | F | U | U | U |
| 50 | D | D | F | U | U | U | D | D | F | U | U | U | U | U |
| 51 | D | F | F | U | U | U | D | F | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | U | D | D | D | D | D | D |
| 56 | Reserved | | | | | | | | | | | | | |
| 254 | | | | | | | | | | | | | | |
| 255 | UE determine the slot format for the slot based on TDD-UL-DL-ConfigurationCommon, or TDD-UL-DL-ConfigDedicated and, if any, on detected DCI formats | | | | | | | | | | | | | |

In Table1, D may refer to DL, U may refer to UL, and F may refer to a flexible symbol. According to Table 1, a total number of slot formats that may be supported may be 256. In the modern NR system, the slot format indicator information has up to 128 bits, and the slot format indicator information bits may be set by the BS for the UE in a higher layer signal (e.g., dci-PayloadSize). In this case, a cell operating in a licensed band or unlicensed band may configure or indicate an additional slot format as in the following Table 2 using one or more additionally introduced slot formats or at least one modified format among the existing slot formats. Table 2 shows an example of slot formats in which to make up a slot with the uplink U and the flexible symbols F.

TABLE 2

| Format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |

In various embodiments of the disclosure, the slot format indicator information may include slot formats for a plurality of serving cells, and a slot format for each serving cell may be identified by a serving cell ID. Furthermore, for each serving cell, a combination of slot format indicators for one or more slots (e.g., slot format combination) may be included. For example, when the slot format indicator information has a size of 3 bits and is comprised of a slot format indicator for one serving cell, the 3-bit slot format indicator information may be one of a total of 8 slot format indicators or a slot format indicator combination (hereinafter, a slot format indicator). In this case, the BS may indicate one of the 8 slot format indicators through a terminal group common information, e.g., group common DCI.

In various embodiments of the disclosure, at least one of the 8 slot format indicators may be comprised of slot format indicators for a plurality of slots. For example, an example of 3-bit slot format indicator information formed with the slot formats in Table 1 and Table 2 is shown in the following Table 3. Referring to Table 3, five pieces of the slot format indicator information (slot format combination IDs 0, 1, 2, 3, and 4) are about a slot format indicator for a slot, and the other three may be information about slot format indicators for four slots (slot format combination IDs 5, 6, and 7) and may be sequentially applied to the four slots. In this case, the slot format indicator information may be sequentially applied from a slot in which the slot format indicator is received.

TABLE 3

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal may receive configuration information for a PDCCH in which to detect the slot format indicator information through a higher layer signal, and detect a slot format indicator according to the configuration. For example, the terminal may be configured with at least one of a configuration of a CORESET in which to detect the slot format indicator information, a search space configuration, information about an RNTI used in CRC scrambling of the DCI in which the slot format indicator information is transmitted, cycle and offset information of search space through a higher layer signal.

A method of allocating a UL resource will now be described. In an embodiment, a UL resource in which to transmit a signal or data may be allocated consecutively or non-consecutively, and when a particular resource allocation type is determined, information indicating UL resource allocation may be interpreted based on the particular resource allocation type. In the meantime, in a 3GPP standard, a signal and a channel are used separately, but in the disclosure, a UL transmission signal or a UL transmission channel may not be separated but may be interchangeably used, or the UL transmission signal may be used to cover or represent both the UL transmission signal and the UL transmission channel. This is because a UL resource allocation scheme or a scheme to determine a UL transmission start position may be commonly applied to both the UL transmission signal and the UL transmission channel. In this case, without extra classification or description, the UL resource allocation scheme or the scheme to determine a UL transmission start position proposed in the disclosure may be independently applied to each of the UL transmission signal and the UL transmission channel.

UL resource allocation type 0

The UL resource allocation type 0 scheme may be to allocate a resource in resource block groups (RGBs) comprised of P consecutive resource blocks (RBs). The size of RGB, P, may be set to one of Configuration 1 and Configuration 2 through e.g., a value of rbg-size of pusch-Config, and P may be determined based on the information and the size of an activated UL BWP as in Table 4. Table 4 may represent a size of P based on a size of a BWP and an RBG setting value. The size of the BWP may be the number of PRBs that make up the BWP.

TABLE 4

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The number $N_{RBG}$ of all RBGs that make up a UL BWP $N_{BWP}$ may be determined to be ceiling $(N_{BWP}^{size}+N_{BWP}^{start}$ mod P)/P), i.e., $N_{RBG}$=ceiling $(N_{BWP}^{size}+N_{BWP}^{start}$ mod P)/P). A size of the first RBG, $RBG_0$, may be P–$N_{BWP}^{start}$ mod P. When the value of $(N_{BWP}^{start}+N_{BWP}^{size})$ mod P is greater than 0, a size of the last RBG, $RBG_{last}$, is $(N_{BWP}^{start}+N_{BWP}^{size})$ mod P, and when the value of $(N_{BWP}^{start}+N_{BWP}^{size})$ mod P is not greater than 0, the last RBG, $RBG_{last}$, may have a size of P. The size of an RBG other than the first and last RBGs may be P. In this case, $N_{BWP}^{start}$ may refer to a CRB at which the BWP is started relatively from CRB0, which may be understood as a point at which a particular BWP is started in the CRB. $N_{BWP}^{size}$ may refer to the number of RBs included in the BWP.

In this case, length (or size or the number of bits) of frequency resource allocation information may be equal to $N_{RBG}$, and the terminal may be configured or scheduled with a resource in RBGs in which UL transmission is configured or scheduled for each RBG through a bitmap comprised of $N_{RBG}$ bits. For example, the terminal may determine that an RBG region set to 1 in the bitmap is a resource allocated for UL transmission, and that an RBG region set to 0 is not a resource allocated for UL transmission. The RBG bitmap is arranged and mapped sequentially (in ascending order) on the frequency axis. In this way, consecutive or non-consecutive RBGs may be allocated for UL transmission.

UL Resource Allocation Type 1

The UL resource allocation type 1 scheme may be a scheme for allocating consecutive frequency resources in an activated UL BWP. Frequency resource allocation information of the UL resource allocation type 1 scheme may be indicated to a terminal through a resource indication value (RIV). The length (or size or the number of bits) of frequency resource allocation information is equal to ceiling $(\log_2 (N_{BWP}(N_{BWP}+1)/2))$. The RIV may indicate a starting RB ($RB_{start}$) for frequency resource allocation and consecutively allocated L RBs ($L_{RBs}$).

[Equation 2]

If $(L_{RBs} - 1) \leq \lfloor \frac{N_{BWP}}{2} \rfloor$ then $RIV =$ $N_{BWP}(L_{RBs} - 1) + RB_{start}$ Else, $RIV = N_{BWP}(N_{BWP} - L_{RBs} - 1) + (N_{BWP} - 1 - RB_{start})$ where, $L_{RBs} \geq 1$ and shall not exceed $N_{BWP} - RB_{start}$ where $N_{BWP}$ may be a size of an activated UL BWP, which is expressed by the number of PRBs, $RB_{start}$ may be the first PRB at which UL resource allocation is started, and $L_{RB}$ may be the length or the number of consecutive PRBs. In this case, when one of pieces of DCI (UL grant) configuring or scheduling UL transmission, e.g., DCI format 0_0, is transmitted in common search space (CSS), initial UL BWP size $N_{BWP,0}$ may be used for $N_{BWP}$.

Furthermore, as for a DCI format of the UL grant, e.g., DCI format 0_0 transmitted in UE specific common search space (USS), a size or the number of bits of the frequency resource allocation information of the UL grant may be determined based on the initial BWP size $N_{initial,BWP}$, but when the UL grant is DCI that schedules another activated BWP, an RIV value is $RB_{start}$=0, K, 2K, ..., $(N_{initial,BWP}-1) \cdot K$ and $L_{RB}$=K, 2K, ..., $N_{initial,BWP} \cdot K$ and is configured as follows.

[Equation 3]

If $(L'_{RBs} - 1) \leq \lfloor \frac{N_{initial,BWP}}{2} \rfloor$ then $RIV = N_{initial,BWP}(L'_{RBs} - 1) + RB'_{start}$ Else, $RIV = N_{initial,BWP}(N_{initial,BWP} - L'_{RBs} - 1) + (N_{initial,BWP} - 1 - RB'_{start})$ where, $L'_{RBs} = \frac{L_{RBs}}{K}, RB'_{start} = \frac{RB_{start}}{K}, L'_{RBs}$ is $N_{initial,BWP} - RB'_{start}$ UL Resource Allocation Type 2

The UL resource allocation type 2 scheme is to allocate resources such that frequency resources in which to transmit UL signals or channels are distributed throughout the activated UL BWP, in which case a distance or a gap between the allocated frequency resources may be the same or equal. With the resource allocation type 2, resources are allocated uniformly across the entire frequency band, so the resource allocation type 2 may be limitedly applied in UL signal and channel transmission with a carrier, cell, or BWP operating in an unlicensed band required to satisfy requirements for frequency allocation such as a power spectral density (PSD) condition, an occupancy channel bandwidth (OCB) condition, etc.

Figure 8:
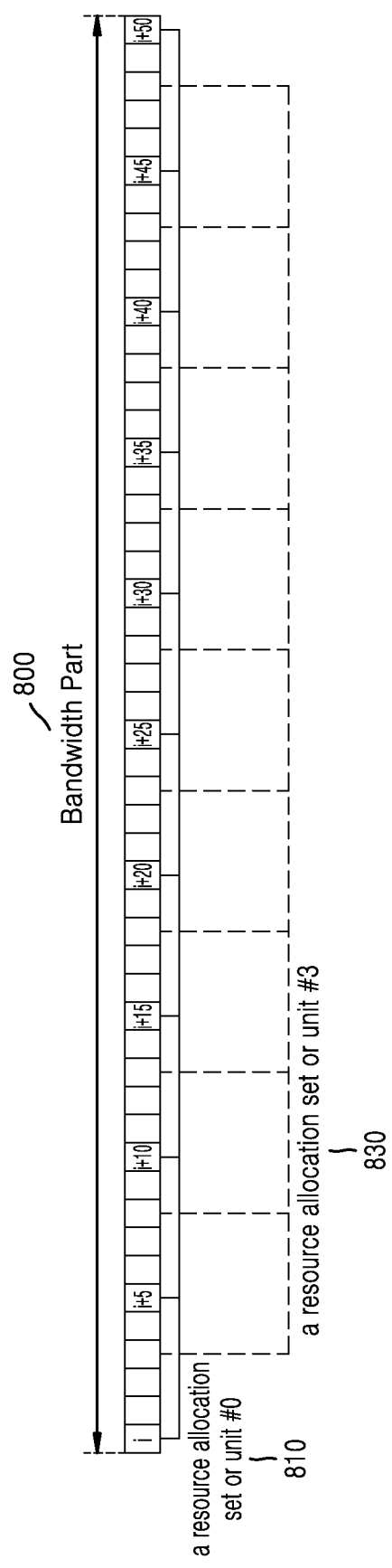
FIG. 8 illustrates a frequency resource allocation method in a wireless communication system, according to various embodiments of the disclosure.

FIG. 8 illustrates a frequency resource allocation method in a wireless communication system, according to various embodiments of the disclosure. Referring to FIG. 8 for example, the UL resource allocation type 2 will now be described. Referring to FIG. 8, an occasion when the terminal is configured to perform UL signal transmission or reception with the BS in a BWP 800 and scheduled for UL data channel transmission in the UL resource allocation type 2 scheme is shown as an example. In FIG. 8, the BWP 800 is assumed to be comprised of 51 PRBs, which is, however, merely an example. According to the resource allocation type 2 scheme, 51 PRBs may be configured with L (L=5 in FIG. 8) resource allocation sets 810, and each resource allocation set may be comprised of $$N = \left\lfloor \frac{N_{BWP}}{L} \right\rfloor \text{ or } N = \left\lfloor \frac{N_{BWP}}{L} \right\rfloor + 1$$

PRBs. In FIG. 8, the first resource allocation set 830 includes 11 PRBs (#i, #i+5, #i+10, #i+15, . . . , #i+45, #i+50), and the other resource allocation set, for example, a fourth resource allocation set, may include 10 PRBs (#i+3, #i+8, #i+13, #i+18, . . . , #i+48). In other words, the number of PRBs included in a resource allocation set may differ by the size of the BWP or the number of PRBs in the BWP. The terminal may be allocated one or more resource allocation sets configured as described above, and may be allocated consecutive resource allocation sets (e.g., resource allocation sets #0, #1, or #2, #3, #4) through a method similar to the resource allocation type 1 scheme, e.g., based on the RIV value, or allocated consecutive or non-consecutive resource allocation sets in a similar way to the UL resource allocation type 0 scheme, e.g., based on a bitmap.

For example, when the terminal is allocated consecutive resource allocation sets, the terminal may determine in a similar way to the UL resource allocation type 1, a frequency resource region (or a resource allocation set) allocated with the RIV expressed with a start resource allocation set $RB_{start}$ for frequency resource allocation and L consecutive resource allocation sets, in which case the RIV is as follows: where N may be a total number of resource allocation sets.

$$\text{If } (L-1) \leq \left\lfloor \frac{N}{2} \right\rfloor \quad \text{then } RIV = N(L-1) + RB_{start} \quad \text{[Equation 4]}$$
$$\text{Else,} \quad RIV = N(N-L-1) + (N-1-RB_{start})$$

For example, RIV=0 indicates the first resource allocation set or the resource allocation set #0, meaning that a resource allocation set comprised of PRBs #i, #i+10, #i+20, . . . , #i+50 of FIG. 8 has been allocated. In this case, the length (or size or the number of bits) of frequency resource allocation information may be equal to ceiling (log$_2$ (N (N+1)/2).

In another example, when the terminal is allocated consecutive or non-consecutive resource allocation sets using a bitmap, the bitmap is configured in L bits respectively indicating L resource allocation sets in ascending frequency resource order or in ascending order of resource allocation set indexes, and the BS may allocate the resource allocation sets through the bitmap. For example, in FIG. 8, with the bitmap configured in 5 bits, a position of a resource allocation set may be indicated, in which case, bitmap '10000' indicates that the first resource allocation set, i.e., a resource allocation set comprised of PRB #i, #i+10, #i+20, . . . , #i+50 of FIG. 8 is allocated. Bitmap 00010 may indicate that the fourth resource allocation set, i.e., a resource allocation set comprised of PRB #i+3, #i+8, #i+13, #i+18, . . . , #i+48 of FIG. 8, is allocated. In this case, the length (or size or the number of bits) of frequency resource allocation information is equal to L.

UL Resource Allocation Type 3

The UL resource allocation type 3 scheme is to allocate frequency resources for UL signal or channel transmission to be distributed throughout the activated UL BWP, and may be characterized in that a resource allocation group (or resource allocation block or resource allocation cluster) of consecutive resources is distributed throughout the BWP in e.g., a repetitive transmission scheme. In other words, the resource allocation group of consecutive resources may be repeatedly present in the frequency domain, and accordingly, there may be a plurality of resource allocation groups in the BWP. With the resource allocation type 3, as consecutive resource allocation groups (or blocks or clusters) are distributed in a frequency band, the resource allocation type 3 may be limitedly applied in UL signal and channel transmission with a carrier, cell, or BWP operating in an unlicensed band required to satisfy requirements for power spectral density (PSD) and for frequency allocation such as an occupancy channel bandwidth (OCB) condition.

In a similar way with the frequency, the terminal may be configured with a time resource region of a UL data channel in the following method. The time resource region of the UL data channel may be indicated to the terminal through a start and length indicator value (SLIV). The SLIV is a value determined by a start symbol S for time resource allocation and L symbols consecutively allocated in a slot as follows. When (L−1) is equal to or smaller than 7, the SLIV may have a value of 14·(L−1)+S, and when (L−1) is greater than 7, the SLIV may have a value of 14·(14−L+1)+(14−1−S). In this case, L may have a value greater than 0 and equal to or smaller than 14.

For a system that performs communication in an unlicensed band, a communication device (a BS or a terminal) that intends to transmit a signal in the unlicensed band may perform a channel access procedure or LBT for the unlicensed band in which to perform communication before transmitting the signal, and access the unlicensed band and perform signal transmission when it is determined that the unlicensed band is in an idle state according to the channel access procedure. When it is determined that the unlicensed band is not in the idle state according to the channel access procedure performed, the communication device may not perform signal transmission.

The channel access procedure in the unlicensed band may be classified by whether a channel access procedure start time of the communication device is fixed (frame-based equipment (FBE)) or variable (load-based equipment (LBE)). In addition to the channel access procedure start time, depending on whether a transmit/receive structure of the communication device has a cycle or no cycle, the communication device may be determined to be the FBE or the LBE. In this case, the channel access procedure start time being fixed may mean that the channel access procedure of the communication device may be started periodically according to a predefined cycle or a cycle declared or set by the communication device. In another example, the channel access procedure start time being fixed may mean that the transmit or receive mechanism of the communication device has a cycle. On the other hand, the channel access procedure start time being variable may mean that the communication device may transmit a signal in an unlicensed band at any time. In another example, the channel access procedure start time being variable may mean that the transmit or receive mechanism of the communication device may be determined when required without having a cycle.

A channel access procedure in the case that the channel access procedure start time of the communication device is variable, i.e., LBE, (hereinafter, traffic based channel access procedure or LBE based channel access procedure) will now be described.

The channel access procedure in an unlicensed band may include measuring strength of a signal received by the communication device in the unlicensed band for a fixed period of time or a period of time calculated according to a predefined rule (e.g., a time calculated with at least a random value selected by the BS or the terminal), and determine an idle state of the unlicensed band by comparing the measured strength of the signal with a predefined threshold or a threshold calculated by a function that determines the magnitude of the strength of the received signal according to at least one attribute among channel bandwidth, bandwidth of a signal for transmission, and/or strength of transmission power.

For example, the communication device may measure the strength of the received signal for a time Xus (e.g., 25 us) immediately before a point in time to transmit a signal, determine that the unlicensed band is in the idle state and transmit a set signal when the strength of the measured signal is less than a threshold T (e.g., −72 dBm) defined or calculated in advance. In this case, after the channel access procedure, a maximum period of time available for consecutive signal transmission may be restricted by a maximum channel occupancy time (MCOT) defined for each country, region, or frequency band based on each unlicensed band. The maximum period of time may also be restricted even by a type of the communication device (e.g., a BS or a terminal, or a master device or a slave device). For example, in the 5 GHz unlicensed band for Japan, a BS or a terminal may occupy a channel to transmit a signal without performing an additional channel access procedure for up to 4 ms for an unlicensed band determined to be in the idle state.

Specifically, when the BS or the terminal intends to transmit a DL or UL signal in the unlicensed band, a channel access procedure that may be performed by the BS or the terminal may be identified as at least one of the following types:

type 1: transmitting a UL/DL signal after performing a channel access procedure for a variable period of time type 2: transmitting a UL/DL signal after performing a channel access procedure for a fixed period of time type 3: transmitting a DL or UL signal without performing a channel access procedure A transmitting apparatus (e.g., a BS or a terminal) which intends to perform signal transmission may determine a type of the channel access procedure according to a type of a signal for transmission. In the 3GPP, a channel access scheme, an LBT procedure may be classified largely into four categories. The four categories may include a first category including a scheme that does not perform LBT, a second category including a scheme that performs LBT without random backoff, a third category including a scheme that performs LBT through random backoff in a fixed sized contention window, and a fourth category including a scheme that performs LBT through random backoff in a variable sized contention window. In an embodiment of the disclosure, the third and fourth categories may be reserved for the type 1, the second category for the type 2, and the first category for the type 3. In this case, the type 2 or the second category that performs a channel access procedure for a fixed period of time may be classified into one or more types according to the fixed period of time for which the channel access procedure is performed. For example, the type 2 may be classified into a type (type 2-1) for performing the channel access procedure for a fixed period of time A us (e.g., 25 us) and a type (type 2-2) for performing the channel access procedure for a fixed period of time B us (e.g., 16 us).

In the disclosure, a transmitting apparatus may be assumed to be a BS, and the transmitting apparatus and the BS may be interchangeably used.

For example, when a BS intends to transmit a DL signal including a DL data channel in an unlicensed band, the BS may perform a channel access procedure in a scheme of the type 1. Otherwise, when a BS intends to transmit a DL signal that does not include a DL data channel in an unlicensed band, i.e., a BS intends to transmit a sync signal or a DL control channel, the BS may perform a channel access procedure in a scheme of the type 2 and transmit a DL signal.

In this case, a scheme of the channel access procedure may be determined according to the length of a signal to be transmitted in the unlicensed band or the length of a period of time or an interval that occupies and uses the unlicensed band. In general, the channel access procedure in a scheme of the type 1 may be performed for a longer period of time than in a scheme of the type 2. Accordingly, when the communication device intends to transmit a signal for a short period of time or a period of time equal to or shorter than a reference time (e.g., X ms or Y symbols), the channel access procedure may be performed in a scheme of the type 2. On the other hand, when the communication device intends to transmit a signal for a long period of time or a period of time equal to or longer than the reference time (e.g., X ms or Y symbols), the channel access procedure may be performed in a scheme of the type 1. In other words, the channel access procedure may be performed in a different scheme depending on a use time of the unlicensed band.

When the transmitting apparatus performs a channel access procedure in a scheme of the type 1 according to at least one of the aforementioned references, the transmitting apparatus that intends to transmit a signal in the unlicensed band may determine a channel access priority class according to a quality of service class identifier (QCI) of the signal to be transmitted in the unlicensed band, and perform the channel access procedure using at least one of setting values predefined as in the following Table 5 for the determined channel access priority class. Table 5 represents mapping relations between the channel access priority class and the QCI. The mapping relations between the channel access priority class and the QCI as in Table 5 are taken as an example without being limited thereto.

For example, QCI 1, 2, and 4 may refer to QCI values for services such as conversational voice, conversational video (live streaming), non-conversational video (buffered streaming). When a signal for a service that does not match the QCI in Table 5 is to be transmitted in an unlicensed band, the transmitting apparatus may select QCI closest to the service in Table 5 and select a corresponding channel access priority class.

TABLE 5

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

In various embodiments, parameter values for a channel access priority class (e.g., defer duration according to the determined channel access priority p, a set of contention window values or sizes, $CW_p$, minimum and maximum values ($CW_{min,p}$ and $CW_{max,p}$), and a maximum channel occupancy interval ($T_{mcot,p}$)) may be determined as in Table 6. Table 6 represents parameter values for channel access priority types for DL.

For example, a BS that intends to transmit a DL signal in an unlicensed band may perform a channel access procedure for the unlicensed band for a minimum time $T_f+m_p*T_{si}$ (e.g., defer duration). When the BS intends to perform a channel access procedure with a channel access priority class 3 (p=3), the size of $T_f+m_p*T_{si}$, which is a size of the defer duration required to perform the channel access procedure, may be set using $m_p=3$. In this case, $T_f$ has a value fixed to 16 us, during which first $T_{si}$ time needs to be in an idle state, and for the remaining time $(T_f-T_{si})$ after $T_{si}$, the BS may not perform the channel access procedure. Even when the BS performs the channel access procedure for the remaining time $(T_f-T_{si})$, the result of the channel access procedure may not be used. In other words, $T_f-T_{si}$ may be a time for which the BS defers performing the channel access procedure.

When it is determined that the unlicensed band is in the idle state for the whole time $m_p*T_{si}$, N may be N−1 (N=N−1). In this case, N may be selected to be any integer value from among values between 0 and a value in a contention window $CW_p$ at a time to perform the channel access procedure. For the channel access priority class 3, a minimum contention window value and a maximum contention window value may be 15 and 63, respectively. When an unlicensed band is determined to be in an idle state in the defer duration and additional duration during which to perform a channel access procedure, the BS may transmit a signal in the unlicensed band for the time $T_{mcot,p}$ (e.g., 8 ms). Although the DL channel access priority class is focused in the disclosure for convenience of explanation, the channel access priority class in Table 6 may be equally used for UL or a separate channel access priority class for UL transmission may be used.

TABLE 6

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value $CW_P$ may be a minimum value of the contention window $CW_{min,p}$. After selecting a value of N, the BS may perform the channel access procedure during the interval $T_{si}$, and when the unlicensed band is determined to be in an idle state through the channel access procedure performed in the interval $T_{si}$, the BS may change the value of N to be N=N−1 and may transmit a signal for the maximum time $T_{mcot,p}$ (or a maximum occupancy time) in the unlicensed band when N becomes 0 (N=0). When the unlicensed band determined through the channel access procedure is not in the idle state in the time $T_{si}$, the BS may perform the channel access procedure again without changing the value of N.

The amount of the value of the contention window $CW_p$ may be changed or maintained according to a rate of NACK, Z, among results (ACK/NACK) of reception of DL data transmitted or reported to the BS by terminals in a reference subframe, a reference slot, or a reference transmission time interval (reference TTI), which have received DL data transmitted through a DL data channel in the reference subframe, the reference slot, or the reference TTI. In this case, the reference subframe, the reference slot, or the reference TTI may be determined as a point in time for the BS to initiate a channel access procedure, a point in time for the BS to select a value of N to perform the channel access procedure, the first subframe, slot, or TTI of the DL signal transmission interval (or MCOT) involved in the most recent transmission of the BS in the unlicensed band immediately before the two points in time, or a start subframe, start slot, or start TTI of the transmission interval.

The terminal may send the BS capability information for the UL channel access procedure type that the terminal is able to support or perform. In this case, the terminal may send the BS whether each UL channel access procedure type is available and a channel access procedure type that the terminal is able to perform in the capability information. In this regard, when it is mandatory for the terminal to support some of the UL channel access procedure types, the terminal may send the BS whether it is able to support a certain UL channel access procedure type in the capability information.

Similarly, the terminal may send the BS capability information for a start position of the UL signal transmission that the terminal is able to support or perform. In this case, the terminal may send the BS information about whether the terminal is able to perform UL signal transmission at each start position in a symbol and the start position of UL signal transmission that the terminal is able to start in the capability information. In this regard, when it is mandatory for the terminal to support some of the UL signal transmission start positions, the terminal may send the BS information about whether it is able to start UL signal transmission at a certain position in the capability information.

Similarly, the terminal may send the BS capability information for a completion position of the UL signal transmission that the terminal is able to support or perform. In this case, the terminal may send the BS information about whether the terminal is able to perform UL signal transmission at each completion position in a symbol and the completion position of UL signal transmission that the terminal is able to stop in the capability information. In this regard, when it is mandatory for the terminal to support some of the UL signal transmission completion positions, the terminal may send the BS information about whether it is able to stop UL signal transmission at a certain position in the capability information.

In addition, the terminal send the BS capability information regarding whether it is able to support at least one of a function that may transmit one or more different transport blocks through one or more UL data channel transmissions through one DCI or a CBG-based UL data channel transmission function. In this case, the terminal may additionally send the BS capability information about the maximum number of TBs that the terminal is able to transmit through one DCI, the maximum number of UL data channels that may be scheduled through one DCI, or the maximum number of CBGs.

In addition, the terminal may send the BS capability information about whether the terminal is able to support a function to simultaneously transmit one or more signals and/or channels among a UL control signal, a UL control channel, and a UL data channel. For example, the terminal may send the BS capability information about whether the terminal is able to support a function to simultaneously transmit the UL control channel and the UL data channel. In the following description of embodiments of the disclosure, assume a terminal that does not support a function to simultaneously transmit the UL control channel and the UL data channel, without being limited thereto.

The disclosure will now be described by assuming an occasion when the terminal transmits, to the BS, capability information regarding at least one of a UL channel access procedure type that the terminal is able to support, a start position of UL signal transmission in the symbol, a completion position of the UL signal transmission in the symbol, whether to support, through one DCI, a function to transmit one or more different TBs through one or more UL data channel transmissions, or whether CB based transmission is available, and based on this, the terminal uses the one or more UL channel access procedure types, the start position of the UL signal transmission in the symbol, the completion position of the UL signal transmission in the symbol, whether to support, through one DCI, a function to transmit one or more different TBs through one or more UL data channel transmissions, or CB based transmission. In this regard, the disclosure may be applied even to a case that the terminal does not transmit at least one of the aforementioned pieces of capability information to the BS.

In the meantime, the aforementioned capability may be independent for each frequency band or a combination of frequency bands. For example, capability for type 1 and type 2 channel access procedures for a frequency band of 5 GHz and type 1, type 2, and type 3 channel access procedures for a frequency band of 6 GHz may be defined. It is also possible that the terminal may determine at least one of a UL channel access procedure type, a start position of UL signal transmission in the symbol, a completion position of the UL signal transmission in the symbol, whether to support, through one DCI, a function to transmit one or more different TBs through one or more UL data channel transmissions, or CB based transmission separately in one of various methods or a combination thereof in the disclosure.

The NR system has a CSI framework for the BS to indicate measurement and report channel state information (CSI) of the terminal. The CSI framework of NR may be comprised of at least two elements: resource settings and report settings, and the report settings may have relationships with the resource settings by referring to one or more IDs of the resource settings.

According to an embodiment of the disclosure, the resource settings may include information regarding a reference signal (RS) for the terminal to measure CSI. The BS may configure at least one resource setting for the terminal. For example, the BS and the UE may exchange signaling information CSI-ResourceConfig to deliver information regarding the resource settings. The signaling information CSI-ResourceConfig may include information about each resource setting. According to the signaling information, each resource setting may include a resource set list csi-RS-ResourceSetList including a resource setting index csi-ResourceConfigId, a BWP index bwp-ID, time domain transmission setting of a resource or at least one resource set. The time domain transmission setting of the resource may be configured in aperiodic transmission, semi-persistent transmission, or periodic transmission. The resource set list may be sets including resource sets for channel measurement or sets including resource sets for interference measurement. When the resource set list is sets including the resource sets for channel measurement, each resource set may include at least one resource, which may be a CSI reference signal (CSI-RS) resource or an index of a synchronization/broadcast channel block (SS/PBCH block, SSB). When the resource set list is sets including the resource sets for interference measurement, each resource set may include at least one interference measurement resource (CSI interference measurement, CSI-IM).

For example, when the resource set includes the CSI-RS, the BS and the terminal may exchange signaling information (NZP-CSI-RS-ResourceSet) for delivering information about the resource set. The signaling information (NZP-CSI-RS-ResourceSet) includes information about each resource set. According to the signaling information, each resource set may include information about at least a resource set index (nzp-CSI-ResourceSetId) or an index set of the CSI-RS included (nzp-CSI-RS-Resources), information about a spatial domain transmission filter of the CSI-RS resource included (repetition), or information about whether to use tracking of the CSI-RS resource included (trs-Info).

The CSI-RS may be the most representative reference signal included in the resource set. The BS and the UE may exchange signaling information (NZP-CSI-RS-Resource) to deliver information regarding the CSI-RS resource. The signaling information (NZP-CSI-RS-ResourceSet) includes information about each CSI-RS.

Information included in the signaling information (NZP-CSI-RS-Resource) may have the following meaning:
    nzp-CSI-RS-ResourceId: CSI-RS resource index
    resourceMapping: resource mapping information of CSI-RS resource
    powerControlOffset: a ratio between PDSCH EPRE (energy per RE) and CSI-RS EPRE
    powerControlOffsetSS: a ratio between SS/PBCH block EPRE and CSI-RS EPRE
    scramblingID: a scrambling index of a CSI-RS sequence
    periodicityAndOffset: slot offset and transmission cycle of CSI-RS resource
    qcl-InfoPeriodicCSI-RS: TCI-state information when the CSI-RS is the periodic CSI-RS
    resourceMappng included in the signaling information (NZP-CSI-RS-Resource) indicates resource mapping information of the CSI-RS resource, and may include frequency resource RE mapping, the number of ports, symbol mapping, a CDM type, a frequency resource density, or frequency band mapping information. With this, the number of ports, the frequency resource density, the CDM type, the time-frequency domain RE mapping may be configured to have predefined certain values.

In the meantime, the report settings may have relationships with the resource settings by referring to at least one ID of the resource settings, and the resource setting(s) having the relationships with the report settings may provide configuration information including information about a reference signal for channel information measurement. When the resource setting(s) having relationships with the report settings are used for channel information measurement, the measured channel information may be used in channel information reporting according to a reporting method set in the related report setting. The report setting may also include setting information related to a CSI reporting method. For example, the BS and the UE may exchange signaling information (CSI-ResourceConfig) to deliver information regarding the report settings.

The signaling information (CSI-ReportConfig) includes information about each report setting. Information included in the signaling information (CSI-ReportConfig) may have the following meaning:

reportConfigId: a report setting index
carrier: a serving cell index
resourcesForChannelMeasurement: a resource setting index for channel measurement having a relationship with the report setting
csi-IM-ResourcesForInterference: a resource setting index having a CSI-IM resource for interference measurement having a relationship with the report setting
nzp-CSI-RS-ResourcesForInterference: a resource setting index having a CSI-RS resource for interference measurement having a relationship with the report setting
reportConfigType: indicates a transmission channel and a time domain transmission configuration for channel reporting and may have aperiodic transmission, semi-persistent PUCCH transmission, semi-persistent PUSCH transmission, or periodic transmission configuration.
reportQuantity: indicates a type of channel information reported, and may have types of channel information in a case of not transmitting and in a case of transmitting the channel report ('cri-RI-PMI-CQI', 'cri-RI-i1', 'cri-RI-i1-CQI', 'cri-RI-CQI', 'cri-RSRP', 'ssb-Index-RSRP', 'cri-RI-LI-PMI-CQI') Elements included in the type of channel information refer to a channel quality indicator (CQI), a precoding matrix indicator (PMI), a CSI-RS resource indicator (CRI), an SS/PBCH block resource indicator (SSBRI), a layer indicator (LI), a rank indicator (RI), and/or L1 reference signal received power (L1-RSRP).
reportFreqConfiguration: indicates whether the channel information reported includes only information about the entire band (wideband) or includes information about each subband, and may have configuration information for the subband including the channel information when the information about each subband is included.
timeRestrictionForChannelMeasurements: indicates whether the time domain is limited for a reference signal for channel measurement among reference signals referred to by the channel information reported
timeRestrictionForInterferenceMeasurements: indicates whether the time domain is limited for a reference signal for interference measurement among reference signals referred to by the channel information reported
codebookConfig: codebook information referred to by the channel information reported
groupBasedBeamReporting: indicates whether to do beam grouping of the channel report
cqi-Table: a CQI table index referred to by the channel information reported
subbandSize: an index indicating a size of the subband of the channel information
non-PMI-PortIndication: port mapping information referred to when non-PMI channel information is reported In a case that the BS indicates channel information reporting through higher layer signaling or L1 signaling, the terminal may perform channel information reporting by referring to the aforementioned configuration information included in the indicated report setting.

The BS may indicate CSI reporting to the terminal through higher layer signaling including radio resource control (RRC) signaling or medium access control (MAC) control element (CE) signaling, or L1 signaling (e.g., common DCI, group-common DCI, or UE-specific DCI).

For example, the BS may indicate aperiodic CSI reporting to the terminal through higher layer signaling or DCI using the DCI format 0_1. The BS may set a parameter for aperiodic CSI reporting of the terminal or multiple CSI report trigger states including a parameter for CSI reporting through higher layer signaling. The parameter for CSI reporting or the CSI report trigger state may include a set including slot offsets or available slot offsets between the PDCCH including the DCI and the physical uplink control channel (PUCCH) including the CSI report or PUSCH including the CSI report, a reference signal ID for channel state measurement, a type of channel information included, etc. When the BS indicates some of the multiple CSI report trigger states to the terminal through the DCI, the terminal may report channel information according to a CSI report setting of the report settings configured in the indicated CSI report trigger state. Time domain resource allocation of the PUCCH or PUSCH including a CSI report of the terminal may be indicated through some or all of the slot offset from the PDCCH indicated through the DCI, an indication of a start symbol and symbol length in the slot for time domain resource allocation of the PUSCH, and a PUCCH resource indication. For example, the BS may indicate a position of a slot in which the PUSCH including the CSI report of the terminal is transmitted through the slot offset from the PDCCH indicated through the DCI, and indicate the start symbol and symbol length in the slot through a time domain resource assignment field of the DCI.

For example, the BS may indicate semi-persistent CSI reporting to the terminal through higher layer signaling or DCI using the DCI format 0_1. The BS may activate or deactivate the semi-persistent CSI reporting through higher layer signaling including MAC CE signaling or DCI scrambled by an SP-SCI-RNTI. When the semi-persistent CSI reporting is activated, the terminal may periodically report channel information according to the set slot offset. When the semi-persistent CSI reporting is deactivated, the terminal may stop the activated periodic reporting of the channel information. The BS may set a parameter for semi-persistent CSI reporting of the terminal or multiple CSI report trigger states including a parameter for the semi-persistent CSI reporting through higher layer signaling. The parameter for CSI reporting or the CSI report trigger state may include a set including slot offsets or available slot offsets between the PDCCH including DCI that indicates CSI reporting and the PUCCH or PUSCH including the CSI report, a slot offset between a slot in which the higher layer signaling indicating CSI reporting is activated and the PUCCH or PUSCH including the CSI report, a slot offset period of CSI reporting, a type of channel information included, etc. When the BS activates some of the multiple CSI report trigger states or some of a number of report settings for the terminal through the higher layer signaling or the DCI, the terminal may report channel information according to a report setting included in the indicated CSI report trigger state or a CSI report setting configured in the activated report setting. The BS may indicate time domain resource allocation of the PUCCH or PUSCH including a CSI report of the terminal through some or all of the slot offset period of the CSI reporting, the slot offset from a slot in which higher layer signaling is activated or the slot offset with the PDCCH indicated through the DCI, an indication of a start symbol and symbol length in the slot for time domain resource allocation of the PUSCH, and a PUCCH resource indication. For example, the BS may indicate a position of a slot in which the PUSCH including the CSI report of the terminal is transmitted through the slot offset from the PDCCH indicated through the DCI, and indicate the start symbol and symbol length in the slot through a time domain resource assignment field of the DCI format 0_1. For example, the BS may indicate a position of a slot in which the PUCCH including the CSI report of the terminal is transmitted through a slot offset cycle of the CSI reporting set through higher layer signaling and a slot offset between the slot in which the higher layer signaling is activated and the PUCCH including the CSI report, and indicate the start symbol and symbol length in the slot through a start symbol and symbol length in which the PUCCH resource configured through higher layer signaling is allocated.

For example, the BS may indicate periodic CSI reporting to the terminal through higher layer signaling. The BS may activate or deactivate periodic CSI reporting through higher layer signaling including RRC signaling. When the periodic CSI reporting is activated, the terminal may periodically report channel information according to the set slot offset. When the periodic CSI reporting is deactivated, the terminal may stop the activated periodic reporting of the channel information. The BS may configure a report setting including a parameter for periodic CSI reporting of the terminal through higher layer signaling. The parameter for CSI reporting may include a slot offset between a slot in which higher layer signaling to indicate CSI reporting is activated and the PUCCH or PUSCH including the CSI report, a slot offset cycle of CSI reporting, a reference signal ID for channel state measurement, a type of channel information included, etc. The BS may indicate time domain resource allocation of the PUCCH or PUSCH including a CSI report of the terminal through some or all of the slot offset period of the CSI reporting, the slot offset from a slot in which higher layer signaling is activated or the slot offset with the PDCCH indicated through the DCI, an indication of a start symbol and symbol length in the slot for time domain resource allocation of the PUSCH, and a PUCCH resource indication. For example, the BS may indicate a position of a slot in which the PUCCH including the CSI report of the terminal is transmitted through a slot offset cycle of the CSI reporting configured through higher layer signaling and a slot offset between the slot in which the higher layer signaling is activated and the PUCCH including the CSI report, and indicate the start symbol and symbol length in the slot through a start symbol and symbol length in which the PUCCH resource configured through higher layer signaling is allocated.

When the BS indicates aperiodic CSI reporting or semi-persistent CSI reporting to the terminal through DCI, the terminal may determine whether to perform valid channel reporting through the indicated CSI reporting by taking into account a channel computation time required for CSI reporting (CSI computation time). For the aperiodic CSI reporting or semi-persistent CSI reporting indicated through DCI, the terminal may perform valid CSI reporting from a UL symbol after Z symbols from the last symbol included in the PDCCH including the DCI that indicates CSI reporting, and the Z symbols may vary by a numerology of a DL BWP corresponding to the PDCCH including the DCI that indicates CSI reporting, a numerology of a UL BWP corresponding to the PUSCH in which a CSI report is transmitted, or a type or property of channel information reported in the CSI report (report quantity, frequency band granularity, the number or ports of the reference signal, a codebook type, etc.). In other words, for a CSI report to be determined as being valid (i.e., for the CSI report to be a valid CSI report), UL transmission of the CSI report needs to include timing advance and is prevented from being performed earlier than Zref symbol. The Zref symbol may be a UL symbol that initiates the cyclic prefix (CP) after a time $T_{proc,CSI}=(Z)$ $(2048+144)\cdot\kappa 2^{-\mu}\cdot T_c$ from the moment the last symbol of the triggering PDCCH is finished.

Details of the value of Z will be described as follows, and $T_c=1/(\Delta f_{max}\cdot N_f)$, $\Delta f_{max}=480\cdot 10^3$ Hz, $N_f=4096$, $\kappa=64$, and $\mu$ may be numerologies. $\mu$ may be agreed to use one of $\mu_{PDCCH}$, $\mu_{CSI-RS}$, and $\mu_{UL}$ that causes the largest value of $T_{proc,CSI}$, $\mu_{PDCCH}$ may refer to the sub-carrier spacing (SCS) used for PDCCH transmission, $\mu_{CSI-RS}$ may refer to the SCS used for CSI-RS transmission, and $\mu_{UL}$ may refer to the SCS of a UL channel used for UL control information (UCI) for CSI reporting.

In another example, $\mu$ may be agreed to use one of $\mu_{PDCCH}$ and $\mu_{UL}$ that causes the largest value of $T_{proc,CSI}$. Definitions of $\mu_{PDCCH}$ and $\mu_{UL}$ may refer to what are described above. For convenience of subsequent explanation, satisfying the above conditions is called satisfying CSI reporting validity condition 1.

Furthermore, when the reference signal for channel measurement for the aperiodic CSI reporting indicated to the UE is an aperiodic reference signal, valid CSI reporting may be performed from a UL symbol after Z' symbols after the last symbol including the reference signal is finished. The Z' symbols may vary depending on a numerology of a DL BWP corresponding to a PDCCH that includes the DCI indicating CSI reporting, a numerology of a bandwidth corresponding to the reference signal for channel measurement for CSI reporting, a numerology of a UL BWP corresponding to a PUSCH that transmits a CSI report, or a type or property of channel information reported in the CSI report (report quantity, frequency band granularity, the number of ports of the reference signal, a codebook type, etc.). In other words, for a CSI report to be determined as being valid (i.e., for the CSI report to be a valid CSI report), UL transmission of the CSI report needs to include timing advance and is prevented from being performed earlier than Zref' symbol. In this case, the Zref' symbol may be a UL symbol that initiates the CP after a time $T'_{proc,CSI}=(Z')$ $(2048+144)\cdot\kappa 2^{-\mu}\cdot T_c$ from the moment the last symbol of the aperiodic CSI-RS or aperiodic CSI-IM triggered by the triggering PDCCH is finished. Details of the value of Z' will be described as follows, and $T_c=1/(\Delta f_{max}\cdot N_f)$, $\Delta f_{max}=480\cdot 10^3$ Hz, $N_f=4096$, $\kappa=64$, and $\mu$ may be numerologies. $\mu$ may be agreed to use one of $\mu_{PDCCH}$, $\mu_{CSI-RS}$, and $\mu_{UL}$ that causes the largest value of $T_{proc,CSI}$, $\mu_{PDCCH}$ may refer to the sub-carrier spacing (SCS) used for the triggering PDCCH transmission, $\mu_{CSI-RS}$ may refer to the SCS used for CSI-RS transmission, and $\mu_{UL}$ may refer to the SCS of a UL channel used for UL control information (UCI) for CSI reporting. In another example, $\mu$ may be agreed to use one of $\mu_{PDCCH}$ and $\mu_{UL}$ that causes the largest value of $T_{proc,CSI}$. Definitions of $\mu_{PDCCH}$ and $\mu_{UL}$ may refer to what are described above. For convenience of subsequent explanation, satisfying the above conditions is called satisfying CSI reporting validity condition 2.

When the BS indicates aperiodic CSI reporting for the aperiodic reference signal to the terminal through DCI, the terminal may perform valid CSI reporting from the first UL symbol that satisfies both a time after Z symbols after the last symbol included in the PDCCH including the DCI that indicates CSI reporting is finished and a time after Z' symbols after the last symbol including the reference signal is finished. In other words, for the aperiodic CSI reporting based on the aperiodic reference signal, a CSI report may be determined to be valid when it satisfies both the CSI reporting validity conditions 1 and 2.

When a time for CSI reporting indicated by the BS fails to meet the CSI computation time requirement, the terminal may determine that the CSI report is not valid and may not consider updating the channel information state for CSI reporting.

The aforementioned Z and Z' symbols to compute the CSI computation time conform to the following Table 7 and Table 8. For example, when channel information reported in the CSI report includes only wideband information, the number of ports of the reference signal is equal to or smaller than 4, there is one reference signal resource, the codebook type is 'typeI-SinglePanel', or the type of a reported channel information (report quantity) is 'cri-RI-CQI', the Z and Z' symbols conform to $Z_1$ and $Z_1'$ values in Table 7. Hereinafter, this will be called 'delay requirement 1'. In addition, when the PUSCH including the CSI report does not include a TB or HARQ-ACK and CPU occupation of the terminal is 0, Z and Z' symbols may conform to $Z_1$ and $Z_1'$ values in Table 8, which will be called 'delay requirement 2'. The CPU occupation will be described later in detail. Furthermore, when the report quantity is 'cri-RSRP' or 'ssb-Index-RSRP', Z and Z' symbols may conform to $Z_3$ and $Z_3'$ values in Table 8. $X_1$, $X_2$, $X_3$, and $X_4$ of Table 8 may refer to UE capability for beam reporting times, and $KB_1$ and $KB_2$ may refer to UE capability for beam change times. When it does not correspond to the type or property of channel information reported in the CSI report, Z and Z' symbols conform to $Z_2$ and $Z_2'$ values of Table 8.7

TABLE 7

| | $Z_1$ [symbols] | |
|---|---|---|
| μ | $Z_1$ | $Z_1'$ |
| 0 | 10 | 8 |
| 1 | 13 | 11 |
| 2 | 25 | 21 |
| 3 | 43 | 36 |

TABLE 8

| | $Z_1$ [symbols] | | $Z_2$ [symbols] | | $Z_3$ [symbols] | |
|---|---|---|---|---|---|---|
| μ | $Z_1$ | $Z_1'$ | $Z_2$ | $Z_2'$ | $Z_3$ | $Z_3'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min (44, $X_3$ + $KB_1$) | $X_3$ |
| 3 | 97 | 85 | 152 | 140 | min (97, $X_4$ + $KB_2$) | $X_4$ |

In a frequency band of 7 GHz or a frequency band below 7 GHz considered in the 5G communication system, a carrier may use up to 100 MHz frequency band. In a frequency band of over 7 GHz or an mmWave frequency band, a carrier may use up to 400 MHz frequency band. In this case, the terminal may communicate with the BS using a portion of the frequency band of the carrier (hereinafter, a bandwidth part (BWP)), and may be configured with the BWP from the BS through a higher layer signal. The BS and the UE performing communication using an unlicensed band may perform a channel access procedure for the unlicensed band before communicating signals in the unlicensed band. As for an unlicensed band near 5 GHz, the unlicensed band may be divided into channels of a unit of 20 MHz, and various communication devices may perform a channel access procedure for each channel separated in the unit of 20 MHz and perform communication using the unlicensed band. Hence, in the 5G communication system that is able to use widebands, to perform communication in the unlicensed band, the communication device may perform the channel access procedure in the unit of 20 MHz. Specifically, in a case that the BS and the terminal perform communication using an unlicensed carrier or cell or a BWP of the carrier or the cell, when a bandwidth of the carrier or cell or a bandwidth of the BWP is larger than 20 MHz, the bandwidth or the BWP may be divided into one or more subbands, and a channel access procedure may be performed in each subband or subband group. In this regard, the subbands may be classified based on the size of the carrier bandwidth or BWP.

For example, the BS may divide the BWP into subbands according to the size of the carrier bandwidth or the BWP configured for the UE. A carrier bandwidth or bandwidth of 80 MHz may be divided into four subbands. The size of the subband may be configured for the UE from the BS through a higher layer signal, which may be equal to the channel size of the unlicensed band including the carrier bandwidth or BWP or may be a multiple of the channel size of the unlicensed band. Furthermore, the size of the subband may be defined by the number of PRBs. For example, the size of the subband may be 20 MHz, which is a channel size of the 5 GHz unlicensed band, or 40 MHz or 80 MHz, which is a multiple of the channel size of the 5 GHz unlicensed band. In another example, the size of the subband may be defined by X PRBs, in which case, a bandwidth corresponding to the X PRBs may be equal to or smaller than 20 MHz bandwidth, which is the channel size of the unlicensed band. Similarly, the size of the subband may be defined by Y and/or Z PRBs corresponding to a bandwidth equal to or smaller than 40 MHz or 80 MHz. In this regard, values of X, Y and Z for each bandwidth may be defined in advance between the BS and the terminal. At least one of the subbands may be different in size from the other subbands. For example, when the carrier bandwidth or BWP has a size of 50 MHz, it may be divided into three subbands. The respective subbands may have a size of 20 MHz, 20 MHz, and 10 MHz, or 10 MHz, 20 MHz, and 20 MHz. The aforementioned number and/or size of the subbands are merely an example, and may be variously changed. In other words, the carrier bandwidth or BWP having a size of 50 MHz may be divided into a subband of a size of 40 MHz and a subband of a size of 10 MHz. In the above example, the size of each subband may be represented by the number of PRBs.

Figure 9:
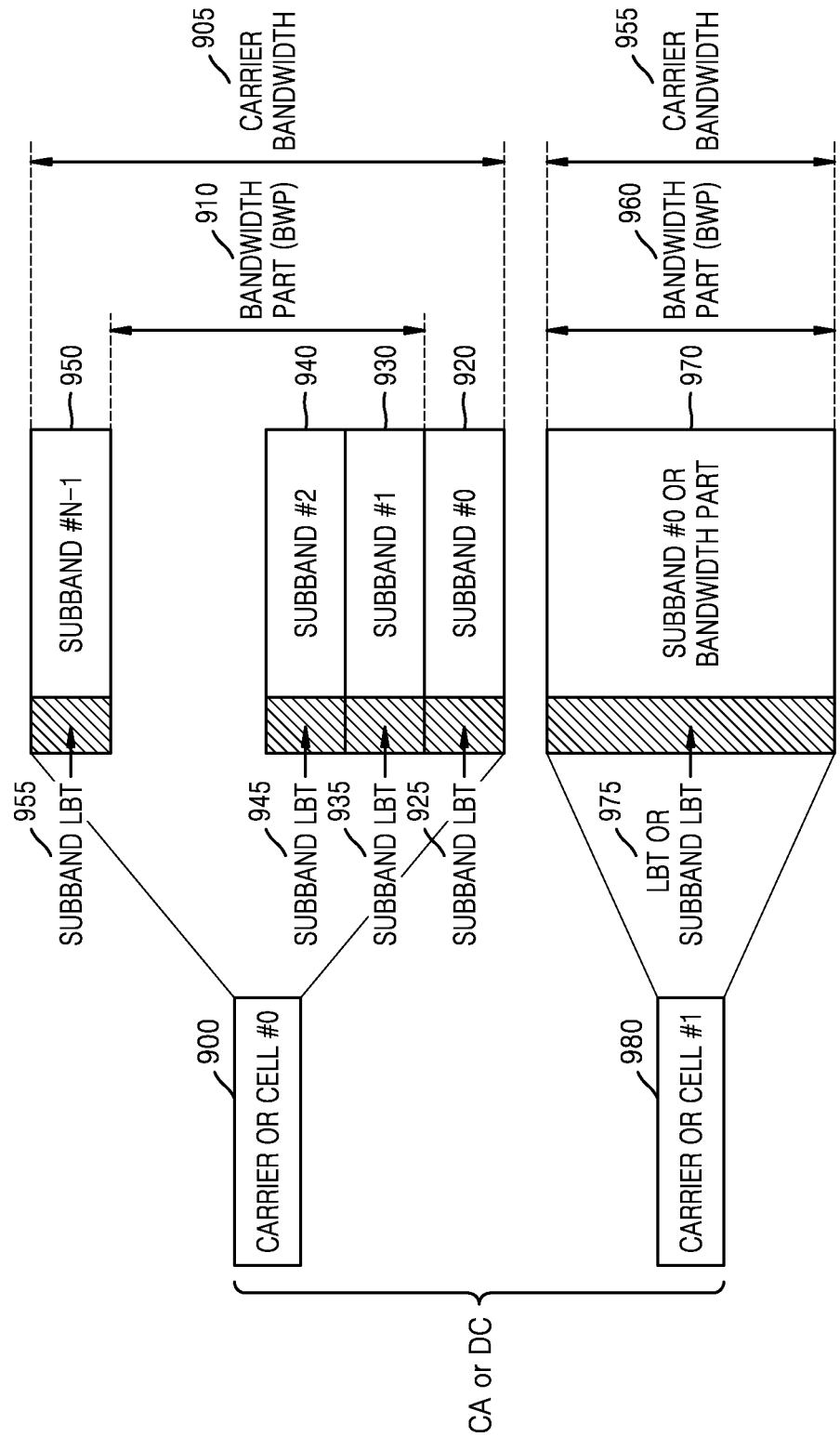
FIG. 9 illustrates an example of classifying listen before talk (LBT) subbands in a wireless communication system, according to various embodiments of the disclosure.

This will be described in more detail in connection with FIG. 9. FIG. 9 illustrates an example of classifying listen before talk (LBT) subbands in a wireless communication system, according to various embodiments of the disclosure. In FIG. 9, shown is an occasion when the terminal communicates with the BS with two unlicensed carriers or cells 900 and 980 (hereinafter, called cell #0 and cell #1). Cell #0 and cell #1 may have carrier bandwidths 905 and 955 in the same size or different sizes. In addition, the UE may be configured with BWPs 910 and 960, which are equal to or smaller than the bandwidths 905 and 955 of cell #0 and cell #1, respectively. Configuration information of the BWPs 910 and 960 (e.g., the BWP sizes) may be the same or may be different. The BS may divide the carrier bandwidth 905 of cell #0 into N subbands as shown in FIG. 9 without dividing the carrier bandwidth 955 or the BWP 960 of cell #1 into subbands or while dividing the carrier bandwidth 955 or the BWP 960 of cell #1 into one subband, and then perform a channel access procedure. In this case, it is also possible for the BS to divide the BWP 910 of the UE into N' subbands. The BS may perform channel access procedures 925, 935, 945 and 955 for the subbands in cell #0 900 and perform a channel access procedure 975 for subband #0 or a carrier or BWP 970 in cell #1 980, and may perform communication in a subband determined to be in an idle state. Hence, as the terminal has varying resource regions available for transmission or reception depending on a result of the channel access procedure for each subband of the BS, the terminal needs to receive the result of the channel access procedure for each subband performed by the BS and accordingly, the terminal may determine an accurate frequency resource region for UL/DL data channel transmission or reception.

The BS may transmit the result of a channel access procedure to the terminal in a DL control channel. In various embodiments of the disclosure, information indicating a result of the channel access procedure of the BS may be referred to as LBT result information. The LBT result information may be defined for each subband, and may include information indicating a result of the channel access procedure for each subband. In various embodiments of the disclosure, assume an occasion when the LBT result information is defined for each subband, but the LBT result information may be defined for each carrier or cell and may include information indicating a result of the channel access procedure for each carrier or cell. Furthermore, when the carrier or cell includes a plurality of subbands, the LBT result information may be defined for each carrier or cell and each subband, and may include information indicating a result of the channel access procedure for each carrier or cell and each subband.

In this case, the BS may transmit the result of the channel access procedure for each subband to the terminal by means of a bitmap. For example, results of channel access procedures for a cell comprised of four subbands may be transmitted to the terminal through a 4-bit bitmap having subband indexes arranged in the ascending order. Each bit may indicate a result of the channel access procedure of the BS for each subband. For example, bit 0 may indicate that the subband is not in the idle state and bit 1 may indicate that the subband is in the idle state. The bit values are an example, but may be set the other way around. Transmission of a result of the channel access procedure for each subband to a terminal may be represented by an operation of transmitting whether the BS has occupied the subband (bit 1) or has not occupied the subband (bit 0) to the terminal, or transmitting whether the BS has transmitted (bit 1) or has not transmitted (bit 0) a DL signal in the subband to the terminal. Transmission of the result of the channel access procedure for each subband may be represented by transmitting whether the BS has transmitted a DL signal in the subband but the DL signal has been punctured (bit 0) or the DL signal has been rate-matched for the subband (or has not been transmitted) (bit 1) to the terminal. In other words, that the BS transmits the result of the channel access procedure for each subband to the terminal may mean that the BS may provide the terminal with information for preventing the terminal from receiving a control signal, a control channel, or a data channel in a subband in which the BS has failed to access the channel. Transmitting the result of the channel access procedure for each subband to the terminal by means of the bitmap is an example, and it is also possible that the BS represents a combination of results of the channel access procedures for the respective subbands in a bitstream and transmits one of the result values to the terminal. When only channel access in consecutive subbands is allowed, e.g., when channel access using non-consecutive subbands such as subbands #0 and #2 is not allowed, transmitting a combination of results of the channel access procedures for the respective subbands in a bitstream to the terminal may minimize the number of bits required for information transmission as compared to transmission of the results of the channel access procedures in a bitmap.

Figure 10:
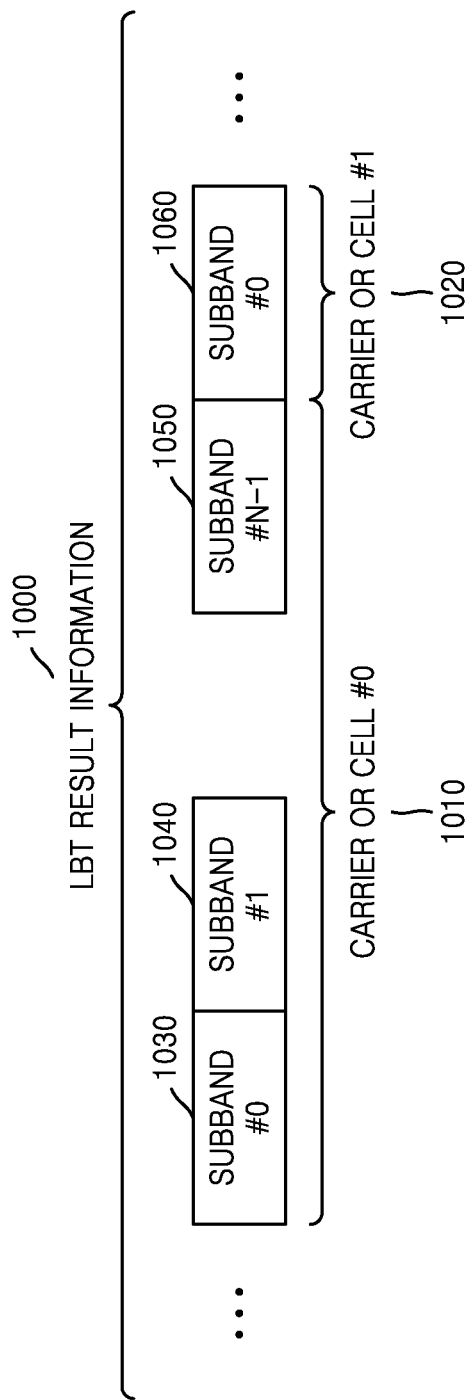
FIG. 10 illustrates an example of LBT result information in a wireless communication system, according to various embodiments of the disclosure.

FIG. 10 illustrates an example of LBT result information in a wireless communication system, according to various embodiments of the disclosure. The BS may transmit the LBT result information to one or more terminals in a DL control channel. The results of the channel access procedures by the BS are information to be shared by all the UEs configured with a BWP including the subbands, so when the BS transmits the results of the channel access procedures for the respective subbands through cell-common or group-common DCI, the BS may minimize signaling required for transmission of the information to the terminals. In this case, the BWP for each terminal may be different, so when the BS transmits the results of the channel access procedures for the respective subbands through cell-common or group-common DCI, the terminal may need to distinguish which position of subband in the BWP configured for the terminal corresponds to the results of the channel access procedures for the respective subbands commonly transmitted by the BS. Hence, when the BS transmits the results of the channel access procedures for the respective subbands through cell-common or group-common DCI, the terminal may be additionally configured with an index of a subband included in the BWP through a higher layer signal. In this case, the terminal may be additionally configured with the maximum number of subbands that may be included in the carrier and/or BWP through the higher layer signal. This will now be described in connection with FIG. 10. FIG. 10 illustrates an example of LBT result information transmitted by the BS. The aforementioned LBT result information may be transmitted to a plurality of terminals, and may thus include not only the information corresponding to the terminal (i.e., LBT result information for cell #0 and cell #1) of FIG. 9, but also information for another cell. Hence, the terminal as shown in FIG. 9 may be configured with e.g., indexes of subbands to determine LBT result information positions 1010 and 1020 of cell #0 and cell #1 in communication with the BS of the LBT result information 1000.

The terminal may transmit UL control information (UCI) to the BS in a PUCCH or PUSCH. The UCI may include at least one of HARQ-ACK information, scheduling request (SR) information or CSI.

When a PUSCH in which the terminal transmits with no data (UL-SCH) in a cell and a PUCCH for transmitting SR information (positive scheduling request) in another cell overlap, the terminal may not transmit the PUSCH.

When a PUCCH in which the terminal multiplexes and transmits UCI including HARQ-ACK information and aperiodic CSI (hereinafter, A-CSI) information and the PUSCH transmission of the terminal overlap, the terminal may multiplex and transmit only the HARQ-ACK information of the UCI in the PUSCH and may not transmit the PUCCH.

When a PUCCH in which the terminal multiplexes and transmits UCI including HARQ-ACK information and semi-persistent CSI (hereinafter, SP-CSI) information and the PUSCH transmission of the terminal overlap, the terminal may multiplex and transmit only the HARQ-ACK information of the UCI in the PUSCH and may not transmit the PUCCH.

When a PUCCH in which the terminal multiplexes and transmits HARQ-ACK information and periodic CSI (hereinafter, P-CSI) information and the PUSCH transmission of the terminal overlap, the terminal may multiplex and transmit the HARQ-ACK information and the P-CSI information of the UCI in the PUSCH and may not transmit the PUCCH.

When a PUCCH in which the terminal multiplexes and transmits UCI including at least HARQ-ACK information and a PUSCH in which to multiplex and transmit A-CSI information overlap, the terminal may multiplex and transmit only the HARQ-ACK information of the UCI in the PUSCH and may not transmit the PUCCH.

When the terminal determines a PUSCH in which to multiplex and transmit UCI, the terminal may determine a PUSCH scheduled by UL grant (e.g., in an NR system, DCI format 0_0 or 0_1, or a new DCI format for scheduling a UL data channel) over a PUSCH, transmission of which is configured by a higher layer signal (e.g., a semi-persistent scheduled PUSCH, a configured grant PUSCH, or a PUSCH for semi-persistent CSI reporting). In other words, in various embodiments of the disclosure, the terminal may determine a PUSCH scheduled by the UL grant transmitted in a DL control channel among PUSCHs in which to multiplex and transmit the UCI. When there is no PUSCH scheduled by the UL grant transmitted in the DL control channel, it may determine one of the PUSCHs, transmission of which is configured by a higher layer signal.

When a plurality of PUSCH transmissions are scheduled and/or configured in a case that the terminal multiplexes and transmits the UCI in a PUSCH in a slot, the terminal may determine one of the plurality of PUSCHs to multiplex and transmit the UCI. The plurality of PUSCHs transmitted in the slot correspond to not only an occasion when the respective PUSCHs are transmitted in different carriers or cells but also an occasion when the plurality of PUSCHs are transmitted in one carrier or cell. When the terminal does not transmit A-CSI in any of the plurality of PUSCHs, the terminal may determine a PUSCH transmitted in a serving cell with the smallest serving cell index (ServCellIndex) among serving cells that transmit the plurality of PUSCHs, as the PUSCH in which to multiplex and transmit the UCI. When there are a plurality of PUSCHs transmitted in the slot in the serving cell determined as described above, the terminal may transmit the UCI in a PUSCH that enables the earliest transmission or a PUSCH with the earliest start of PUSCH transmission. When there is a PUSCH in which to transmit A-CSI, the terminal may transmit the UCI in the PUSCH.

In the meantime, that a PUCCH and a PUSCH overlap may refer to an occasion when there is at least one same symbol in the PUCCH transmission region and the PUSCH transmission region. Furthermore, that a plurality of PUSCHs are transmitted may mean that the plurality of PUSCHs are transmitted in one or more cells in a particular slot. In this case, when the plurality of PUSCHs are transmitted in one cell, it may mean that the PUSCHs do not overlap one another. When a PUSCH scheduled by a UL grant overlaps a PUSCH, transmission of which is configured by a higher layer signal, the terminal may not transmit the PUSCH, transmission of which is configured by the higher layer signal.

That a PUCCH in which UCI is transmitted and a PUSCH overlap and some or all of UCI may be multiplexed and transmitted in the PUSCH, as described above, may refer to an occasion when both the CSI reporting validity condition and at least the following condition for UCI multiplexing are satisfied.

In a case that the terminal needs to transmit a plurality of overlapping PUCCHs or overlapping PUCCH and PUSCH in a slot, when the PUCCH or PUSCH transmission is a response to DL control information and the terminal is configured to multiplex and transmit many different pieces of UCI information in one PUCCH, the first symbol $S_0$ of the PUCCH or PUSCH that is transmitted at the earliest time among the PUCCHs or PUSCHs in the slot may satisfy the following condition:

- $S_0$ may not correspond to a symbol before a symbol in which CP is started after a time $T^{mux}_{proc,1}=(N_1+d_{1,1}+1)(2048+144)\cdot\kappa\cdot2^{-\mu}\cdot T_c$ from the moment the last symbol of the PDSCH is finished. $\mu$ may be the smallest SCS among SCS of the PDCCH that schedules the PDSCH and the smallest SCS of SCSs of the overlapping PUCCH or PUSCH in which HARQ-ACK information is transmitted as a result of PDSCH reception of the terminal.

- $S_0$ may not correspond to a symbol before a symbol in which CP is started after a time $T^{mux}_{proc,release}=(N+1)(2048+144)\cdot\kappa\cdot2^{-\mu}\cdot T_c$ from the moment the last symbol of the PDCCH that indicates the release of the semi-persistent PDSCH is finished. $\mu$ may be the smallest SCS among SCS of the PDCCH that indicates the release of the semi-persistent PDSCH, SCS of the overlapping PUCCH, the smallest SCS of SCSs of the overlapping PUCCH or PUSCH in which response HARQ-ACK information of the terminal to an indication of the release of the semi-persistent PDSCH is transmitted.

- when there is no PUSCH from among the overlapping PUCCH and PUSCH, in which to multiplex and transmit aperiodic CSI, $S_0$ may not correspond to a symbol before a symbol in which CP is started after a time $T^{mux}_{proc,2}=\max((N_2+d_{2,1}+1)(2048+144)\cdot\kappa\cdot2^{-\mu}\cdot T_c, d_{2,2})$ from the moment the last symbol of the PDCCH that schedules PUSCH transmission and the PDCCH that schedules the PDSCH or the PDCCH that indicates the release of the semi-persistent PDSCH is finished. $\mu$ may be the smallest SCS among SCS of the PDCCH and the smallest SCS of SCSs of the overlapping PUCCH or PUSCH. When there is no overlapping PUSCH, $d_{2,1}$ and $d_{2,2}$ may be 0.

- when there is a PUSCH from among the overlapping PUCCH and PUSCH, in which to multiplex and transmit aperiodic CSI, $S_0$ may not correspond to a symbol before a symbol in which CP is started after a time $T^{mux}_{proc,CSI}=\max((Z+d)(2048+144)\cdot\kappa\cdot2^{-\mu}\cdot T_c, d_{2,2})$ from the moment the last symbol of the PDCCH that schedules PUSCH transmission and the PDCCH that schedules the PDSCH or the PDCCH that indicates the release of the semi-persistent PDSCH is finished. $\mu$ may be the smallest SCS among SCS of the PDCCH, SCS of the overlapping PUCCH or PUSCH, the smallest SCS of SCSs of the PUSCH in which to transmit aperiodic CSI information. When there is no overlapping PUSCH, $d_{2,1}$ and $d_{2,2}$ may be 0. When $\mu$ is 0 (15 kHz) or 1 (30 kHz), d=2, when $\mu$ is 2 (60 kHz), d=3, and when $\mu$ is 3 (120 kHz), d=4.

For a terminal that performs UL transmission in an unlicensed band, the terminal may or may not perform UL transmission in at least one of the PUSCH and/or the PUCCH depending on a result of the channel access procedure. In other words, when the terminal multiplexes and transmits the UCI in a PUCCH or a PUSCH transmitted in an unlicensed band, there may be a change in cell and/or channel in which to transmit the UCI, depending on the channel access procedure result of the terminal. In this case, the BS is unable to know of the result of the channel access procedure of the terminal in advance, a method according to which the terminal determines a cell and/or a channel in which to multiplex and transmit the UCI is required. Accordingly, in the disclosure, a method in which a terminal uses at least one of a type of the channel access procedure performed by the terminal, a size of a gap interval, or a channel access procedure result of the BS to determine a cell and/or a channel in which to multiplex and transmit the UCI may be proposed. In this regard, it is also possible to determine a PUSCH in which to multiplex and transmit the UCI in respective embodiments, a combination of the respective embodiments, or a combination of some of the respective embodiments of the disclosure.

Embodiment 1

A Method of Determining a PUSCH in which to Transmit the UCI According to a Type of a Channel Access Procedure (or an LBT Type)

Embodiment 1 relates to a method of determining a PUSCH in which to transmit the UCI according to a type of the channel access procedure performed in PUSCH transmission in a case that the terminal transmits the UCI in at least one of a plurality of PUSCHs scheduled and/or configured. For example, the UCI transmission probability in an unlicensed band may be increased as high as possible when the terminal transmits the UCI in one of the plurality of PUSCHs, which may be transmitted without performing the channel access procedure or which has the shortest time required to perform the channel access procedure. Specifically, in embodiment 1, the terminal may transmit the UCI in a PUSCH with the highest priority determined from priorities as shown in Table 9.

TABLE 9

| Priority | Channel access procedure type |
| --- | --- |
| First priority | Channel access procedure type 3 |
| Second priority | Channel access procedure type 2-2 |
| Third priority | Channel access procedure type 2-1 |
| Fourth priority | Channel access procedure type 1 |

For example, in a case that the UCI is transmitted in at least one of the plurality of PUSCHs scheduled or configured, the terminal may transmit the UCI in a PUSCH among the PUSCHs, that requires performing the channel access procedure of type 3. When there are multiple PUSCHs that perform the channel access procedure of type 3, the terminal may transmit the UCI in a carrier or cell with the smallest carrier index or cell index (e.g., smallest ServCellIndex) and/or a subband with the smallest subband index (e.g., smallest SubbandIndex) among carriers, cells or subbands in which the PUSCH is transmitted.

When there is no PUSCH that requires performing the channel access procedure of type 3 among the PUSCHs, the terminal may transmit the UCI in a PUSCH that requires performing the channel access procedure of type 2-2. When there are multiple PUSCHs that perform the channel access procedure of type 2-2, the terminal may transmit the UCI in a carrier or cell with the smallest carrier index or cell index (e.g., smallest ServCellIndex) and/or a subband with the smallest subband index (e.g., smallest SubbandIndex) among carriers, cells or subbands in which the PUSCHs are transmitted.

When there is no PUSCH that requires performing the channel access procedure of type 2-2 and type 3 among the PUSCHs, the terminal may transmit the UCI in a PUSCH that requires performing the channel access procedure of type 2-1. When there are multiple PUSCHs that perform the channel access procedure of type 2-1, the terminal may transmit the UCI in a carrier or cell with the smallest carrier index or cell index (e.g., smallest ServCellIndex) and/or a subband with the smallest subband index (e.g., smallest SubbandIndex) among carriers, cells or subbands in which the PUSCHs are transmitted.

When there is no PUSCH that requires performing the channel access procedure of type 2-1, type 2-2 and type 3 among the PUSCHs, the terminal may transmit the UCI in a PUSCH that requires performing the channel access procedure of type 1. When there are multiple PUSCHs that perform the channel access procedure of type 1, the terminal may transmit the UCI in a carrier or cell with the smallest carrier index or cell index (e.g., smallest ServCellIndex) and/or a subband with the smallest subband index (e.g., smallest SubbandIndex) among carriers, cells or subbands in which the PUSCHs are transmitted.

Embodiment 2

A Method of Determining a PUSCH in which to Transmit UCI According to a Gap Interval Size Embodiment 2 relates to a method of determining a PUSCH in which to transmit the UCI according to the size of a gap interval between a PUSCH transmission start time and a completion time of previous DL transmission, UL transmission of the terminal, or UL transmission of another UE in a case that the terminal transmits the UCI in at least one of a plurality of PUSCHs scheduled and/or configured. For example, it may be a method in which the terminal transmits the UCI in a PUSCH having the shortest gap interval between a PUSCH transmission start time and a completion time of the previous transmission or a PUSCH with a gap interval within a certain time range, among the plurality of PUSCHs.

Figure 11:
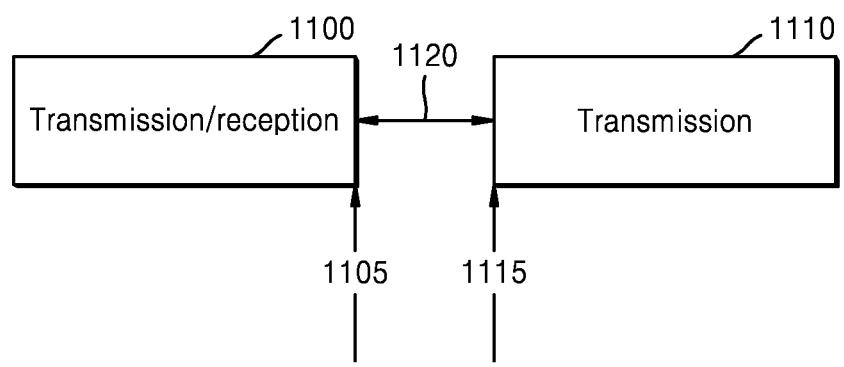
FIG. 11 is a diagram for explaining a gap between two transmissions in a wireless communication system, according to various embodiments of the disclosure.

The gap interval refers to a time during which no signal nor channel is transmitted between two consecutive transmissions. FIG. 11 is a diagram for explaining a gap between two transmissions in a wireless communication system, according to various embodiments of the disclosure.

From the perspective of the terminal, for example, a gap interval 1120 of FIG. 11 may be a time from a point 1105 for the terminal to stop receiving a DL signal or channel 1100 to a point 1115 right before the terminal starts to transmit a UL signal or channel 1110. In another example, the gap interval 1120 may be a time from the point 1105 for the terminal to stop transmitting a UL signal or channel 1100 to the point 1115 right before the terminal starts to transmit another UL signal or channel 1110. In yet another example, the gap interval 1120 may be a time from the point 1105 for another terminal, which is different from the terminal, to stop transmitting a UL signal or channel 1100 to the point 1115 right before the terminal starts to transmit another UL signal or channel 1110. From the perspective of the BS, for example, the gap interval 1120 of FIG. 11 may be a time from the point 1105 for the BS to stop receiving a DL signal or channel 1100 to the point 1115 right before the BS starts to transmit another DL signal or channel 1110. In another example, the gap interval 1120 may be a time from the point 1105 for the terminal to stop transmitting a UL signal or channel 1100 to the point 1115 right before the start of transmission of DL signal or channel 1110. In this case, a type of a channel access procedure for transmission of DL or UL signal or channel 1110 may be determined according to the size of the gap interval. For example, when the gap interval 1120 is equal to or less than 16 μs, the terminal or the BS may perform one of the channel access procedures of type 3 or type 2-2 and transmit the signal or channel 1110. In another example, when the gap interval 1120 is equal to or less than 25 μs or greater than 16 μs and equal to or less than 25 μs, the terminal or the BS may perform the channel access procedure of type 2-1 and transmit the signal or channel 1110. When the gap interval 1120 is greater than 25 μs, the terminal or the BS may perform the channel access procedure of type 1 and transmit the signal or channel 1110.

Accordingly, the terminal may transmit a PUSCH performing the channel access procedure type 3 or without performing a channel access procedure, so the UCI transmission probability in the unlicensed band may be increased as high as possible by transmitting the UCI in a PUSCH having the shortest gap interval or a PUSCH having a size of gap interval within a certain range as in embodiment 2. Specifically, in embodiment 2, the terminal may transmit the UCI in a PUSCH with the highest priority determined from priorities as shown in Table 10. Gap interval sizes of Table 10 are an example and are not limited to the values.

TABLE 10

| Priority | Gap interval size X (us) |
| --- | --- |
| First priority | X ≤ 16 |
| Second priority | 16 ≤ X ≤ 25 |
| Third priority | X > 25 |

For example, in a case the UCI is transmitted in at least one of the plurality of PUSCHs scheduled or configured, the terminal may transmit the UCI in a PUSCH having a gap interval corresponding to the first priority of Table 8 among the PUSCHs. When there are multiple PUSCHs having the gap interval corresponding to the first priority, the terminal may transmit the UCI in a PUSCH with the shortest gap interval or in a carrier or cell with the smallest carrier index or cell index (e.g., smallest ServCellIndex) and/or a subband with the smallest subband index (e.g., smallest SubbandIndex) among carriers, cells or subbands in which the PUSCHs are transmitted.

When there is no PUSCH having a gap interval corresponding to the first priority of Table 8 among the PUSCHs, the terminal may transmit the UCI in a PUSCH with a gap interval corresponding to a second priority of Table 8. When there are multiple PUSCHs having the gap interval corresponding to the second priority, the terminal may transmit the UCI in a PUSCH with the shortest gap interval or in a carrier or cell with the smallest carrier index or cell index (e.g., smallest ServCellIndex) and/or a subband with the smallest subband index (e.g., smallest SubbandIndex) among carriers, cells or subbands in which the PUSCHs are transmitted.

When there is no PUSCH having a gap interval corresponding to the first priority and the second priority of Table 8 among the PUSCHs, the terminal may transmit the UCI in a PUSCH with a gap interval corresponding to a third priority of Table 8. When there are multiple PUSCHs having the gap interval corresponding to the third priority, the terminal may transmit the UCI in a PUSCH with the shortest gap interval or in a carrier or cell with the smallest carrier index or cell index (e.g., smallest ServCellIndex) and/or a subband with the smallest subband index (e.g., smallest SubbandIndex) among carriers, cells or subbands in which the PUSCHs are transmitted.

Embodiment 3

A Method of Determining a PUSCH in which to Transmit UCI According to a Result of the BS Performing the Channel Access Procedure Embodiment 3 may relate to a method in which the terminal determines a PUSCH in which to transmit UCI. It may be a method of determining a PUSCH in which to transmit the UCI based on a result of the BS performing the channel access procedure, which is received by the terminal from the BS, especially when there are multiple PUSCHs in which to transmit the UCI.

For example, the BS may deliver a result of the channel access procedure for each subband and/or a result of the channel access procedure for each carrier or cell performed by the BS (hereinafter, referred to as LBT result information) to the terminal in a DL control channel. In addition, the BS may also deliver channel occupancy time information for a channel accessed by the BS or for corresponding carrier, cell, or subband to the terminal in a DL control channel. The channel occupancy time information and the LBT result information may be sent in the same DL control channel or different DL control channels. Hence, embodiment 3 may relate to a method in which the terminal that obtains the LBT result information and the channel occupancy time information from the BS determines, through the information, a PUSCH in which to transmit the UCI to be one of a PUSCH, or a carrier, a cell or a subband determined to have a channel occupied by the BS. The PUSCH, or the carrier, cell or subband determined to have a channel occupied by the BS based on the LBT result information and the channel occupancy time information received by the terminal from the BS may refer to a PUSCH transmitted in the carrier, cell, or subband indicated to have a channel occupied by the BS through the LBT result information of the BS, a PUSCH transmitted within the channel occupancy time of the BS based on the channel occupancy time information of the BS, or a PUSCH transmitted within the channel occupancy time of the BS among the carrier, cell or subband indicated to have a channel occupied by the BS based on the LBT result information and channel occupancy time information of the BS. When there are multiple PUSCHs or multiple carriers, cells or subbands determined to have a channel occupied by the BS, the terminal may transmit the UCI in a carrier with the smallest index, a cell with the smallest cell index (e.g., smallest ServCellIndex) and/or a subband with the smallest subband index (e.g., smallest SubbandIndex) among the carriers, cells or subbands in which the PUSCHs are transmitted.

Figure 12:
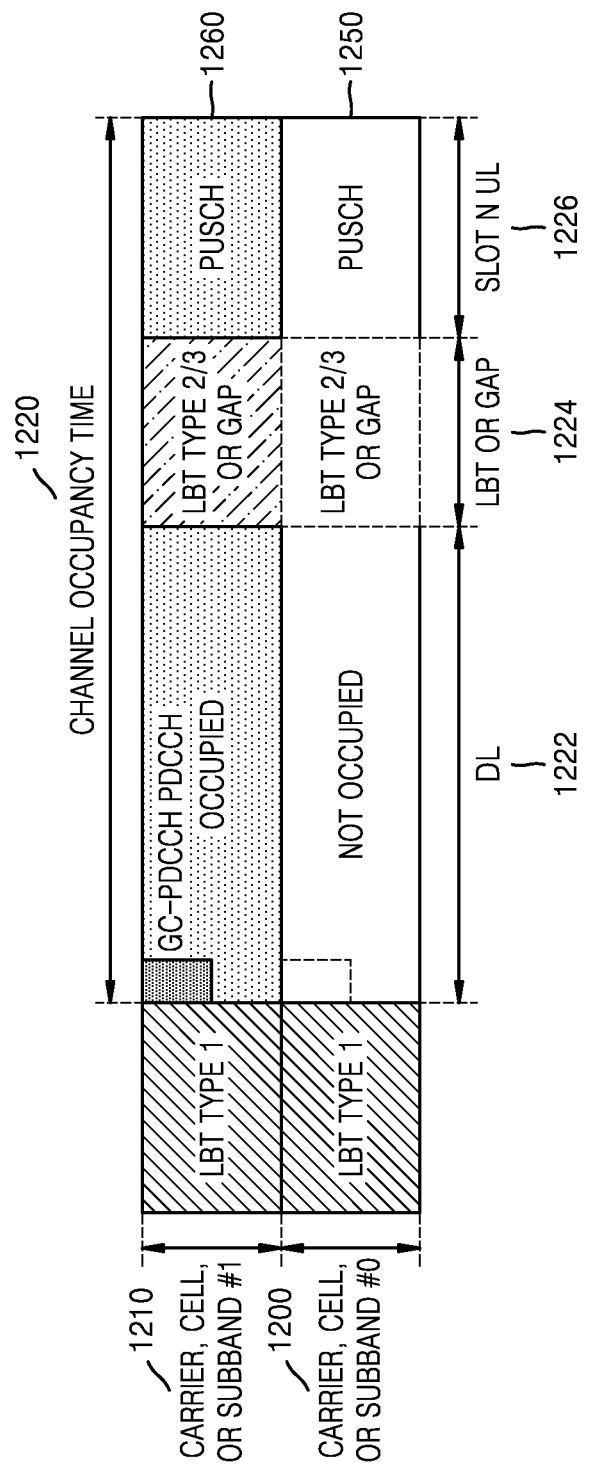
FIG. 12 illustrates an example of selecting a physical uplink shared channel (PUSCH) in which to multiplex and transmit uplink control information (UCI), according to various embodiments of the disclosure.

This will be described in more detail in connection with FIG. 12. FIG. 12 illustrates an example of selecting a PUSCH in which to multiplex and transmit UCI, according to various embodiments of the disclosure. Although FIG. 12 illustrates an occasion when a terminal performs communication using two different unlicensed carriers or cells (1200 and 1200) with a BS, it may be equally applied to an occasion when the terminal performs communication with the BS in an unlicensed band carrier or cell divided into two subbands 1200 and 1210. For convenience of explanation, in FIG. 12, an occasion when the terminal and the BS perform communication using two different unlicensed cell #0 1200 and cell #1 1210 will now be described. The BS may perform a channel access procedure for each of cell #0 1200 and cell #1 1210. In this case, the channel access procedure performed by the BS to occupy each cell may be different depending on a type and/or information of a signal or channel to be transmitted to the terminal, which is not, however, related to what are proposed in the disclosure, so the detailed description thereof will be omitted. The BS may occupy a cell determined to be in the idle state as a result of the channel access procedure for a channel occupancy time 1220, and transmit at least one of a DL control signal, a control channel, or a data channel or receive at least one of a UL control signal, a control channel, or a data channel from the terminal in the unlicensed band during the channel occupancy time 1220. The channel occupancy time 1220 may be a time for which the BS is able to occupy the unlicensed band that the BS starts to occupy after performing the channel access procedure without performing an additional channel access procedure. The BS may transmit a result of the channel access procedure for each cell, i.e., LBT result information, to the terminal in a DL control channel. The BS may also transmit channel occupancy time information for the entire cells or for each cell with a channel occupied to the terminal in a DL control channel. The channel occupancy time information may be represented by a channel occupancy start time and/or a channel occupancy completion time, the number of corresponding slots and/or symbols, a slot index and/or symbol index corresponding to the channel occupancy start time and/or the channel occupancy completion time, or the number of slots or symbols from a slot or symbol in which the DL control channel for transmitting the channel occupancy time information is transmitted to a slot or symbol in which channel occupancy is finished. In the meantime, the BS may transmit slot format indicator information for a slot within the channel occupancy time to the terminal, which may in turn implicitly determine the channel occupancy time information based on the slot format indicator information. A detailed method in which the BS transmits the channel occupancy time information to the terminal may be different from what is described above, but this is not related with what are proposed in the disclosure, so the description thereof will be omitted.

For example, the BS may transmit the LBT result information (e.g., cell #0 1220: not occupied, cell #1 1210: occupied) and the channel occupancy time 1220 to the terminal in the DL control channel. Furthermore, the BS may transmit a slot format indicator for a slot within the channel occupancy time 1220 to the terminal, which may in turn, determine a DL interval 1222, a UL interval 1226, and a gap interval 1224 in the channel occupancy time 1220.

As shown in FIG. 12, in a case that the terminal scheduled and/or configured to perform PUSCH transmissions 1250 and 1260 from cell #0 1200 and cell #1 1210 in slot n needs to transmit UCI in one of the PUSCHs 1250 and 1260, the terminal may transmit the UCI in the PUSCH 1260 in the cell 1210 in which the BS has succeeded in occupying the channel based on the LBT result information of the BS. When the cell in which the BS has succeeded in occupying the channel is in the plural, the terminal may transmit the UCI in a cell with the smallest cell index (e.g., smallest ServCellIndex) among the cells.

Embodiment 4

When a plurality of PUSCH transmissions are scheduled and/or configured in a case that the terminal multiplexes and transmits the UCI in a PUSCH in a slot, the terminal may determine one of the plurality of PUSCHs to multiplex and transmit the UCI. The plurality of PUSCHs transmitted in the slot may correspond to not only an occasion when the respective PUSCHs are transmitted in different carriers or cells but also an occasion when the plurality of PUSCHs are transmitted in one carrier or cell. When the terminal does not transmit A-CSI in any of the plurality of PUSCHs, the terminal may determine a PUSCH transmitted in a serving cell with the smallest serving cell index (ServCellIndex) among serving cells that transmit the plurality of PUSCHs, as the PUSCH in which to multiplex and transmit the UCI. When there are a plurality of PUSCHs for transmission in the slot in the serving cell with the smallest serving cell index ServCellIndex, the terminal may transmit the UCI in a PUSCH that enables the earliest transmission or a PUSCH with the earliest start of PUSCH transmission. When at least one of the plurality of PUSCHs is transmitted in a licensed cell, the terminal may determine a PUSCH transmitted in a serving cell with the smallest serving cell index (ServCellIndex) among serving cells that transmit the plurality of PUSCHs in the licensed band as the PUSCH in which to multiplex and transmit the UCI. When there are a plurality of PUSCHs for transmission in the slot in the serving cell determined as described above, the terminal may transmit the UCI in a PUSCH that enables the earliest transmission or a PUSCH with the earliest start of PUSCH transmission.

In a case that the PUCCH in which the terminal multiplexes and transmits the UCI is transmitted in the licensed band, when there is no PUSCH transmitted in the scheduled and/or configured licensed band but a PUSCH transmitted in at least one unlicensed band cell, the terminal may not transmit the PUSCH but transmit a PUCCH to be transmitted in the licensed cell.

When both the PUCCH and the PUSCH in which the terminal multiplexes and transmits the UCI are transmitted in the unlicensed band cell, the terminal may determine a PUSCH in which to multiplex and transmit the UCI through the respective embodiments, a combination of the respective embodiments, or a combination of some of the respective embodiments of the disclosure.

When the plurality of PUSCHs are all transmitted in the unlicensed band cell, the terminal may determine a PUSCH in which to multiplex and transmit the UCI through the respective embodiments, a combination of the respective embodiments, or a combination of some of the respective embodiments of the disclosure. In various embodiments of the disclosure, the determining of a carrier, a cell, or a subband in which to transmit the UCI to be the carrier or cell with the smallest carrier or cell index (e.g., smallest ServCellIndex) or the subband with the smallest subband index (e.g., smallest SubbandIndex) is merely an example, without being limited thereto. For example, it may be also possible to transmit the UCI in a carrier, cell or subband with the largest index.

Figure 13:
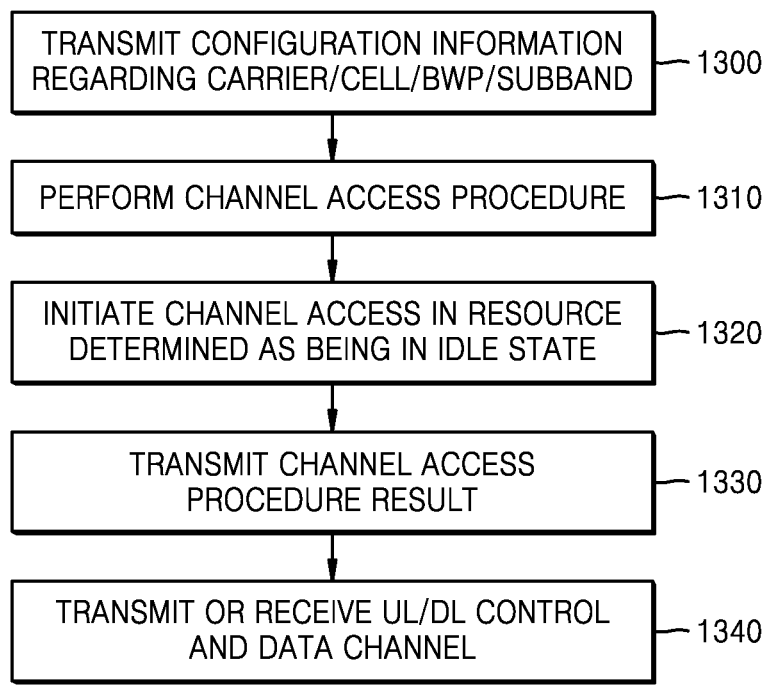
FIG. 13 is a diagram illustrating operations of a BS, according to an embodiment.

FIG. 13 illustrates operations of a BS that performs the disclosure. Referring to FIG. 13, although not shown, the BS may receive capability information about at least one of a UL channel access procedure type that the terminal is able to support, a start position of UL signal transmission in the symbol, a completion position of UL signal transmission in the symbol, whether to support a function enabling transmission of one or more different TBs through one or more UL data channel transmissions in one DCI, and whether code-block based transmission is enabled, through a report of the capability information from the terminal.

In operation 1300, the BS may transmit configuration information regarding a carrier or cell and a corresponding frequency band in which to perform communication with the terminal or configuration information regarding a BWP in which to perform communication with the terminal in a bandwidth of the frequency or cell to the terminal through a higher layer signal. When the carrier or cell is an unlicensed band carrier or cell, the BS may divide the bandwidth or BWP of the BS or the cell into one or more subbands, and transmit the subband configuration information to the terminal through a higher layer signal.

In operation 1310, the BS may perform a channel access procedure. In this regard, the channel access procedure may be performed based on the entire bandwidth of the carrier or cell or in a unit of a BWP or one or more subbands.

In operation 1320, the BS may occupy the channel with the carrier, cell, BWP or subband determined to be in the idle state through the channel access procedure.

In operation 1330, the BS may transmit a channel access procedure result to the terminal. The channel access procedure result may be transmitted to the terminal in a DL control channel, which may be transmitted to all terminals in the cell or a particular terminal group. In this regard, although not shown, the BS may transmit information about a time used to occupy the unlicensed band (channel occupancy time) and/or slot format information to the terminal.

In operation 1340, the BS may perform communication with the terminal for the channel occupancy time.

The aforementioned operations may not be performed sequentially, but may be performed in different order, and even a certain operation may be skipped.

Figure 14:
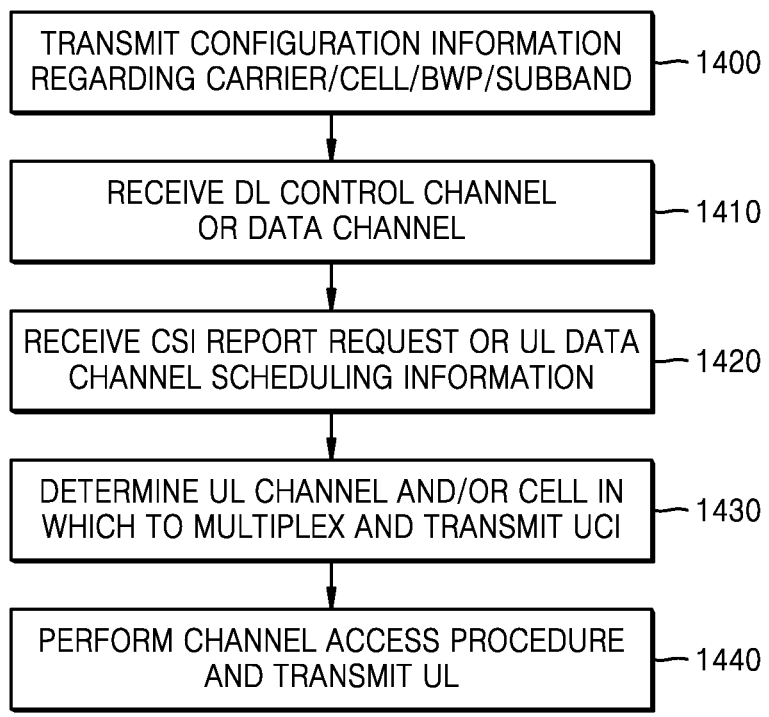
FIG. 14 is a diagram illustrating operations of a UE, according to an embodiment.

FIG. 14 illustrates operations of a terminal that performs the disclosure. Referring to FIG. 14, in operation 1400, the terminal may be configured with configuration information regarding a carrier or cell and a corresponding frequency band in which to perform communication with the BS or configuration information regarding a BWP in which to perform communication with the BS in a bandwidth of the frequency or cell from the BS through a higher layer signal. In a case that the carrier or cell is an unlicensed band carrier or cell, when the BS divides the bandwidth or BWP of the BS or the cell into one or more subbands, the terminal may be configured with the subband configuration information from the BS through a higher layer signal.

In operation 1410, the terminal may receive a channel access procedure result of the BS and/or information about a time used by the BS to occupy the unlicensed band (channel occupancy time) and/or slot format information in a DL control channel. The channel access procedure result of the BS may be configured in a unit of one or more carriers, cells, BSPs, or subbands. In operation 1420, the terminal may receive a DL control channel that schedules DL data channel reception and associated DL data channel, a DL control channel that schedules UL data channel transmission, a DL control channel that requests CSI information reporting, or a DL control channel that requests UL control signal transmission.

In operation 1430, when the terminal needs to multiplex and transmit UCI in a PUCCH or PUSCH, the terminal may determine a UL channel and/or cell in which to multiplex and transmit the UCI according to various embodiments of the disclosure.

In operation 1440, the terminal may subsequently perform UL transmission scheduled and/or configured through a higher layer signal in the aforementioned embodiment, and may perform a channel access procedure for the UL transmission when required.

The aforementioned operations may not be performed sequentially, but may be performed in different order, and even a certain operation may be skipped.

In the disclosure, the expression like 'equal to or greater (larger) than' or 'equal to or smaller (less) than' is used to determine whether a particular condition (or criterion) is fulfilled, but the expression may not exclude meaning of 'exceeding' or 'smaller (less) than'. A condition written with 'equal to or greater (larger) than' may be replaced with 'exceeding', a condition with 'equal to or smaller (less) than' may be replaced with 'smaller (less) than', and a condition with 'equal to or greater (larger) than . . . and smaller (less) than . . . ' may be replaced with 'exceeding . . . and equal to or smaller (less) than . . . '.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. Each of the memories may be provided in the plural.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments of the disclosure may be operated by being combined with one another if necessary. For example, parts of the methods proposed in the disclosure may be combined to operate the BS and the terminal. Although the embodiments of the disclosure are proposed based on 5G or NR systems, modifications to the embodiments of the disclosure, which do not deviate from the scope of the disclosure, may be applicable to other systems such as an LTE system, an LTE-A system, an LTE-A-Pro system, etc.

The invention claimed is:

1. A method performed by a user equipment (UE) in a wireless communication system, the method comprising:
   receiving scheduling information for a plurality of physical uplink shared channels (PUSCHs) from a base station;

identifying a time difference between a transmission time for each of the plurality of PUSCHs and a transmission time for a PUSCH transmitted before the plurality of PUSCHs or a time difference between the transmission time for each of the plurality of PUSCHs and a reception time of a downlink (DL) channel received before the plurality of PUSCHs;

identifying a channel access type available for the UE for each of the plurality of PUSCHs based on the time difference for each of the plurality of PUSCHs;

determining a PUSCH corresponding to a channel access type requiring a shortest time to perform a channel access procedure in an unlicensed band among the plurality of PUSCHs based on the identified channel access type, wherein the channel access type requiring the shortest time has the time difference corresponding to a smallest value; and transmitting uplink control information (UCI) to the base station via the determined PUSCH.

2. The method of claim 1, further comprising:
receiving, from the base station, at least one of information about a result of a channel access procedure performed by the base station for each channel or information about a channel occupancy time for a channel accessed by the base station; and
identifying a channel occupied by the base station based on the received information.

3. The method of claim 2, wherein the PUSCH is transmitted in the channel occupied by the base station.

4. The method of claim 1, wherein the PUSCH is transmitted in a cell corresponding to a smallest index value.

5. The method of claim 1, wherein the channel access procedure performed by the UE in the unlicensed band is listen before talk (LBT).

6. The method of claim 1, wherein the channel access type requiring the shortest time has the time difference within a preset time.

7. A method performed by a base station in a wireless communication system, the method comprising:
transmitting scheduling information for a plurality of physical uplink shared channels (PUSCHs) to a user equipment (UE);
identifying a time difference between a reception time for each of the plurality of PUSCHs and a reception time for a PUSCH received before the plurality of PUSCHs or a time difference between the reception time for each of the plurality of PUSCHs and a transmission time of a downlink (DL) channel transmitted before the plurality of PUSCHs;
identifying a channel access type available for the UE for each of the plurality of PUSCHs based on the time difference for each of the plurality of PUSCHs;
determining a PUSCH corresponding to a channel access type requiring a shortest time to perform a channel access procedure in an unlicensed band among the plurality of PUSCHs based on the identified channel access type, wherein the channel access type requiring the shortest time has the time difference corresponding to a smallest value; and
receiving, from the UE, uplink control information (UCI) via the determined PUSCH.

8. The method of claim 7, further comprising:
performing a channel access procedure in the unlicensed band; and
transmitting, to the UE, at least one of information about a result of the channel access procedure performed by the base station for each channel or information about a channel occupancy time for a channel accessed by the base station.

9. The method of claim 8, wherein the PUSCH is received in a channel occupied by the base station.

10. A user equipment (UE) in a wireless communication system, the UE comprising:
a transceiver; and
at least one processor configured to control the transceiver,
wherein the at least one processor is configured to:
control the transceiver to receive scheduling information for a plurality of physical uplink shared channels (PUSCHs) from a base station,
identify a time difference between a transmission time for each of the plurality of PUSCHs and a transmission time for a PUSCH transmitted before the plurality of PUSCHs or a time difference between the transmission time for each of the plurality of PUSCHs and a reception time of a downlink (DL) channel received before the plurality of PUSCHs,
identify a channel access type available for the UE for each of the plurality of PUSCHs based on the time difference for each of the plurality of PUSCHs,
determine a PUSCH corresponding to a channel access type requiring a shortest time to perform a channel access procedure in an unlicensed band among the plurality of PUSCHs based on the identified channel access type, wherein the channel access type requiring the shortest time has the time difference corresponding to a smallest value, and
control the transceiver to transmit uplink control information (UCI) to the base station via the determined PUSCH.

11. The UE of claim 10, wherein the at least one processor is configured to:
receive, from the base station, at least one of information about a result of a channel access procedure performed by the base station for each channel or information about a channel occupancy time for a channel accessed by the base station; and
identify a channel occupied by the base station based on the received information.

12. The UE of claim 11, wherein the PUSCH is transmitted in the channel occupied by the base station.

13. The UE of claim 10, wherein the PUSCH is transmitted in a cell corresponding to a smallest index value.

14. The UE of claim 10, wherein the channel access procedure performed by the UE in the unlicensed band is listen before talk (LBT).

15. The UE of claim 10, wherein the channel access type requiring the shortest time has the time difference within a preset time.

* * * * *